United States Patent [19]

Goss et al.

[11] Patent Number: 4,667,290
[45] Date of Patent: May 19, 1987

[54] COMPILERS USING A UNIVERSAL INTERMEDIATE LANGUAGE

[75] Inventors: Clinton Goss, New York; Richard Rosenberg, Brooklyn, both of N.Y.; Peter Whyte, Fort Lee, N.J.

[73] Assignee: 501 Philon, Inc., New York, N.Y.

[21] Appl. No.: 648,554

[22] Filed: Sep. 10, 1984

[51] Int. Cl.$^4$ .............................................. G06F 9/44
[52] U.S. Cl. .................................................... 364/300
[58] Field of Search ........................................ 364/300

[56] References Cited

U.S. PATENT DOCUMENTS 4,309,756  1/1982  Beckler .............................. 364/300
4,398,249  8/1983  Pardo et al. ........................ 364/300

OTHER PUBLICATIONS

Alfred V. Aho, Jeffrey D. Ullman, *Principles of Compiler Design*, 261-263, 327-349 (Third printing, Apr. 1979).
William A. Wulf, "PQCC: A Machine Relative Compiler Technology", Sep. 28, 1980.
R. Steven Glanville and Susan L. Graham, "A New Method for Code Generation", Conference Record of the Fifth Annual Symposium on Principles of Programming Languages.
K. V. Nori, U. Amman, K. Jenson, H. H. Nägeli, Ch. Jacobi, "The PASCAL <P> Compiler: Implemention Notes", Institut für Informatils, Jul. 1976.
Inder-jeet S. Gujral, "Retargetable Code Generation for ADA* Compilers", Summary prepared for submission to the 1982 SIGPLAN Symposium on Compiler Construction, Dec. 1981.

*Primary Examiner*—Raulfe B. Zache
*Attorney, Agent, or Firm*—Kenyon and Kenyon

[57] ABSTRACT

A method for directing a digital data processor to translate a program written in a source language into a sequence of machine executable instructions. The method consists of the translation of the source code into an intermediate language, followed by generation of object code for the target machine, the method being generally applicable to known source languages and to digital data processors.

40 Claims, 2 Drawing Figures

COMPILERS USING A UNIVERSAL INTERMEDIATE LANGUAGE

For those ordinarily skilled in the art, attached is a microfiche appendix providing a complete coding printout of the present invention which will be of benefit.

SUMMARY OF THE INVENTION

This invention relates to a method for transforming computer programs written in a high level language into a series of machine executable steps; that is, the process of compilation. More particularly this invention relates to a method for compilation involving a unique intermediate language. The disclosed method of compilation and intermediate language are adaptable to compilation of many different high level languages for execution on many digital data processors presently available.

A fundamental conflict in computer science concerns the goals of creating a flexible and sophisticated language for writing applications programs and the need for programs that can be executed rapidly and require a minimum of space within a computer. An approach to these conflicting needs has been the process of compilation. Compilation comprises running a separate computer program, termed a compiler, in order to convert a high level language program (the source code) possessing the desired attributes of flexibility and ease of use, into a sequence of steps (object code) which are executable on the hardware of a particular computing machine. Measures may be taken during the compilation process which will ensure that the object code created by the compiler will run economically on the computer.

At the present time, a number of different high level languages exist. Examples are BASIC, FORTRAN, C, COBOL, PASCAL, and RPG. Source code, designed to guide a computer in the solution of a particular problem or series of computations is written in a high level language. Each language is defined by a set of rules and these rules are independent of any computer.

In most prior art methods, compilers were designed on an individual basis. A programmer would write a compiler intended to produce object code for a particular computer model ("target-machine") for a chosen high level language. While a compiler might be designed in blocks or modules, where each such block performed a separate task, and a particular set of such tasks was recognized in the field as being required for compilation, in each case compiler design required that the entire design process be repeated de novo. This was a significant drawback both because of the time required, and also because non-standard program modules are more difficult for other programmers to maintain and modify. In addition each different computer model would require a completely different compiler.

Some prior art methods therefore compiled several languages for a given machine using an intermediate language. Others compiled a language onto several machines. The best of these could compile several languages onto several machines. However, none could compile even a significant subset of commercial languages onto a significant subset of commercially available machines. Accordingly, it is an object of the present invention to develop a group of compilers each of which uses the same universal intermediate language. The universal language included in these compilers is to be sufficiently flexible that compilers can be adapted to most commercially significant high level languages, especially strongly typed static languages. The high level languages contemplated include: COBOL, FORTRAN, BASIC, PASCAL, RPG, PL/I, ADA, C and MODULA-2. The universal language is also to be sufficiently flexible that compilers can be adapted to most commercially significant machines.

While any standard mainframe may be used, the source code listed in appendices A, B & C is particularly adapted to use with machines built around the Motorola 68,000 chip. This chip is widely used in a number of currently marketed machines. The Intel 8086 chip is another chip around which many machines are built. The present invention may be easily adapted to such machines. It is expected that compilers using the present invention will require about 128 k bytes of main memory. This limit is not definite.

Some prior art compilers also optimized the object code they produced, so that that object code would run more economically on a computer. However, a need has long been felt for a method of combining optimization techniques so that they could be used on different computer models ("target machines"). Accordingly, it is a further object of the present invention to develop a group of compilers (compiling various high level languages onto various target machines) which optimize a universal intermediate language. Such compilers are all to use the same optimizer, thus being susceptible of relatively cheap, rapid development.

In addition, there has always been room for object code that could rule more economically, i.e., in a smaller space or more quickly. Accordingly, it is a further object of the present invention to develop compilers which utilize a unique combination of optimizing techniques, allowing for the production of efficient object code.

Briefly, in each compiler, source code is converted into object code by a program or programs which compose a front end, a back end, and a middle portion, dealing with a unique intermediate language.

The front end pass or passes convert source code to the intermediate language and a symbol table. Because each front end converts its respective source code into the same intermediate language, the front ends for each programming language are somewhat different. However, because the intermediate language is independent of the target machine, the same front end can be used for a single high level language in connection with most commercially available target machines.

An optimizer in the middle portion manipulates the intermediate code and the symbol table created by the front end pass or passes in order to optimize both the number of machine steps required to execute the program being compiled and to minimize the amount of computer memory required to run the program. The intermediate code is then optimized using a unique combination of optimization techniques. These optimizations are entirely independent of the source code and of the target machine.

The back end pass or passes create object code from the intermediate code and the symbol table. Since the object code must consist of instructions that can be executed by a particular target machine the back end will also differ from one compiler to another. However, since the intermediate code is source code independent, all compilers for the same target machine can use substantially the same back end, even though they compile different high level languages.

The back end performs additional optimization according to a unique combination of optimization techniques.

DETAILED DESCRIPTION OF THE PREFERRED EMBODIMENT

Because of the complexity of the invention, it is impractical to describe the preferred embodiment in English alone. Therefore, a fully commented copy of source code is attached as appendices A, B, C, and D. This source code uses the unique intermediate language and its accompanying symbol table and the preferred optimizing techniques. Appendix A is a compiler for COBOL. Appendix B is a compiler for C-BASIC. Appendix C is a compiler for M-BASIC. Appendix D is a listing of auxiliary tools used to generate the compilers.

Figure 1:
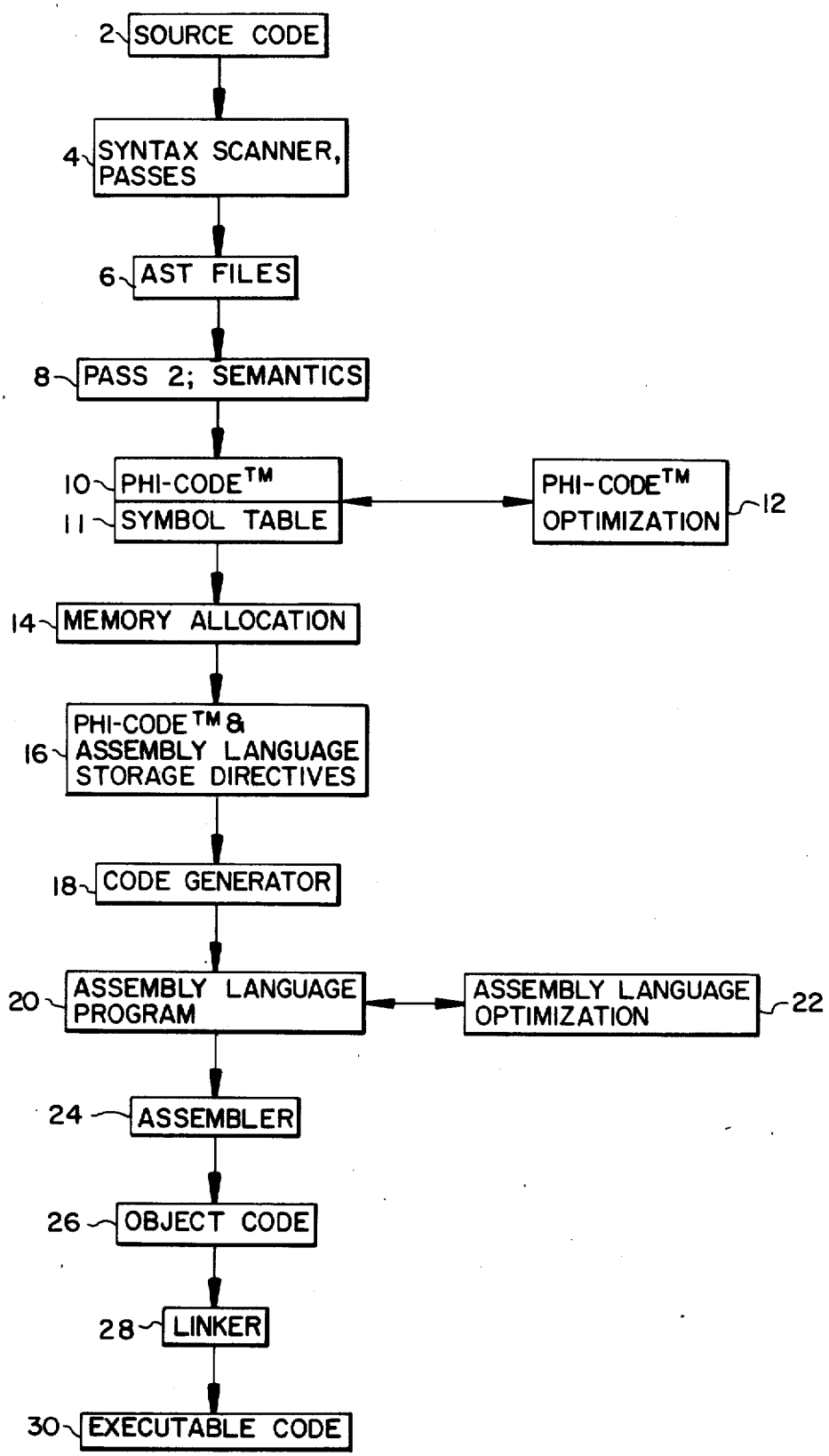
FIG. 1 is a flow chart showing an overview of a compiler which uses the preferred embodiment of the invention.

It will be seen that each compiler has certain structural similarities. Each follows the general pattern shown in FIG. 1. Source code 2 is manipulated by a first pass 4 to produce AST files 6. This is called a syntax pass.

Figure 2:
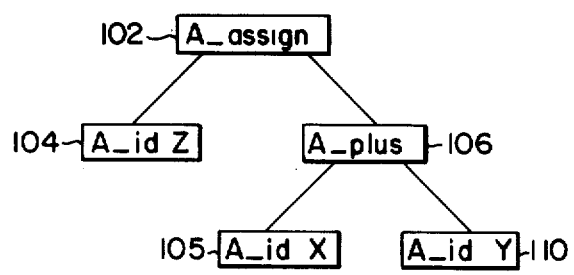
FIG. 2 is an AST tree for the FORTRAN statement $Z=X+Y$.

An AST tree for the FORTRAN statement $$Z=X+Y$$

is shown in FIG. 2. The functions performed by the syntax pass are well known in the art. See, e.g., A. Aho & J. Ullman *Principles of Compiler Design* (Addison-Wesley 1979) (This reference is cited for the convenience of the reader only. The principles recited therein are well known to all who are skilled in the art.)

The AST files 6 are then manipulated by a second pass 8 to produce an intermediate language called Phi-code TM 10 and a symbol table.

Optimization routines 12 then manipulate the phi-code TM 10. This manipulation enables the ultimate object code to run more quickly and in a smaller amount of space.

The optimized Phi-code TM 10 and the symbol table 11 are then manipulated by memory allocation routine 14 which produces Phi-code TM and assembly language storage directives 16.

These in turn are manipulated by a code generator 18 which produces an assembly language program 20. Assembly language optimization routines 22 then manipulate the assembly language program 20 so that the object code 26 can ultimately run more quickly and in less space.

The assembly language program 20 then passes through an assembler 24 to produce object code 26. The object code 26 then passes through a linker 28 to produce executable code 30.

I. Front Ends of Compilers According to the Present Invention

The first and second passes 4 and 8 are referred to as a front end. These are source code dependent and target machine independent. The memory allocation 14, code generator 18, assembly language optimization 22, assembler 24, and linker 28 referred to as a back end. These are target machine dependent and source code independent.

The first pass 4, the syntax pass, consists in broad terms of the analysis of each line of source code to identify "tokens". The tokens are the logical units from which the function of the source code will be deduced in subsequent passes. The source code statements are broken down into tokens by way of a scanner. Because the appropriate symbols differ somewhat from one programming language to another, the scanner must also be developed according to the rules of each programming language. The second phase of the syntax pass 4, referred to as parsing, consists of organizing the tokens in a logical relationship to one another. The temporary file which represents the output file for the syntax is the abstract syntax tree (AST file) 6 and is formed according to the grammatical rules of the language being compiled. These rules are summarized in a parse table constructed for the particular programming language. An example of a parse table and corresponding AST statements for COBOL is shown in Appendix I. On the other hand, the form of the entries in the AST file 6 is the same for each language; each entry is made in reverse postfix or prefix notation. See Aho and Ullman, *Principles of Compiler Design* 254-256 (Addison-Wesley 1979). (The concepts described in this reference are well known in the art. The reference is cited for the convenience of the reader.)

The syntax phase 4 processes source code 2 and outputs an AST 6 representation of that code. Programs and program fragments are represented in the AST as trees. For example, the FORTRAN assignment $$Z=X+Y \qquad (eqn\ 1)$$

might be represented by the tree shown in FIG. 2.

Each node of the tree is labeled by a node (operator) name. Most node names label nodes with a fixed number of subtrees. These are said to be nodes of fixed arity. To represent lists, it is necessary to use nodes that may have an arbitrary number of subtrees—these are referred to as n__ary nodes.

All node names are written in lower case, and start with the prefix "a__", e.g., "a__plus". All n__ary nodes are written with the suffix "s", e.g., "a__stmts". The set of nodes allowed for a particular language is tailored to that language—the form of AST is the same for all languages, but the identity and arity of the nodes differ. A particular AST will have nodes from the following general groups: nodes for grouping structures (compilation unit, module, package, etc.), nodes for declarations, nodes for statements, and nodes for expressions and operators.

The AST is represented in polish prefix form, that is, as a preorder walk of the tree. Thus a node of known arity appears as the node name, followed by the prefix form of each of its children, in left to right order. For an n__ary node, a list head operator (the name of the list node) is followed by the prefix form of the list elements (children), and followed by a list end operator. If "a__xxxs" is the name of the list node, then the list end operator will be "a__endxxx". The AST file resulting from the assignment of equation 1 would contain the following entries:

a__assign 102      eqn 2 a__id Z 104      eqn 3 a_plus 106                                    eqn 4 a_id X 108                                    eqn 5 a_id Y 110                                    eqn 6

Names (of variables, types, etc.) and literals in the AST are always leaves in the AST. They are represented by pointers into the "name table". (This term will be defined below, under SYMBOL TABLE) This makes all names the same size in the AST. Note that literals are not converted to internal representation by the scanner or the parser. They are maintained as strings so that constant folding may be done (in BCD) to arbitrary precision. This allows cross compilation between machines with different basic data sizes.

Since the syntax and semantic passes create and read the AST sequentially, the AST is stored in files simply as a stream of nodes and name table markers. AST files are maintained by the AST manager which provides routines for manipulating such files.

The heart of the syntax analysis phase is a parser which translates the source code 2 into an abstract syntax parse tree (AST). As is now standard in compiler construction, the parsers are driven directly from a context free grammar for the high level language. The grammar embodies the syntactic structure of valid programs in the compiled language and contains auxiliary directives used by the parser for building the parse tree and recovering from syntax errors. The grammar is translated into a compact table representation and the table is interpreted during actual source code parsing.

In the preferred embodiment, the parsers are based on topdown, LL(1) parsing methods, instead of the academically popular LR(1) LALR.

The second pass of the compiler, semantic analysis 8, uses the AST file 6 as its input and converts this into the intermediate language, Phi-code TM 10, in the preferred embodiment. A second product of the second pass is a symbol table 1 which contains entries for all of the objects in the AST file 6. As will be described below in greater detail, "objects" are all entries in memory and include operands, operators and labels.

II. Phi-code TM Design

A. Introduction

The present invention generates, for a variety of high level languages, a common intermediate code. The preferred embodiment of this code, known as Phi-code TM may be taken down two runtime paths. First, high level data flow optimization may be performed, followed by code generation into native code for a target machine. This path is normally used for the production version of a program—the resultant code is highly optimized but contains no debugging capabilities.

The other route, to interpret the Phi-code TM directly, provides the user with symbolic debugging features at the expense of execution speed.

Structure of the Phi-Code TM

Phi-code TM is organized into files. A file contains the Phi-code TM corresponding to the compilation of a single source file. Each file contains a list of quadruples (quads). The term "quad" signifies that there are four operative parts: the operator and its three operand fields. Each quad has an associated ordinal which gives its sequential (zero-based) position in the file. The quads may be retrieved sequentially or by their ordinal.

The general form of a quad is: Operator, Field 1, Field 2, Field 3, Line Column Start End An explanation of each part follows.

1. Operator—This field is the 'opcode' of the quad. This field determines the operation or purpose of the quad as well as the presence and contents of each of the other three fields. For example "q_plus", "q_jmp".

2. Line, Col—These locations give the line and column number of the high-level language source statement from which this quad came. These entries are always present.

3. Start, End—Boolean values which are on if this quad marks the start and/or end of a basic block, respectively. These entries are always present.

4. Fieldn—Depending on the operator (also called the 'opcode' in this document), from zero to three Fields may be present. A field may contain one of three things: a literal value, a name table marker, or an operand.

a. A literal is a 16 bit signed integer value.

b. A name table marker is a pointer into the names table. This is used for quads which work on strings.

c An operand is a reference to a program object—a variable, constant, procedure object, etc. An operand consists of a block index, a block displacement, an indirect bit, a use bit, and a live bit. The first two are used to access the block table and obtain information about the object. They are usually input to routines in the symbol table manager module to, for example, get or set the value of the object. The indirect bit indicates whether the operator is accessing the object directly or using the object as a pointer to the real operand. The use bit indicates whether the value of this operand is needed by another quad in this basic block. The live bit indicates whether the value of this operand is live on exit from the current basic block. Note that these bits are independent—the setting of one implies nothing about the setting of the other.

C. Phi-code TM Operators

The Phi-code TM 10 is produced from the AST file 6. This is done by a preorder walk through the tree (a postorder walk in the case of expressions). The operators of the Phi-code TM 10 are often identical to nodes in the AST tree, however, this is not a one-to-one mapping. Temporary variables are added to the symbol table to carry intermediate results which are implicit in the AST. It also needs to perform transformations on the tree which produce additional quads. One important transformation is to convert high-level control statements into simple tests and jumps.

In the list of quads in Appendix III, the words OPERAND and RESULT indicate fields which are operands. LITERAL indicates those fields which are literal integers. NAME indicates those fields which are pointers into the "names table". (This term will be defined in the symbol table section below) When necessary for clarity, these names will be suffixed by an integer ordinal.

As a general rule, quads are homogeneous. That is, their operands have the same type and size. For example, the q_plus quad can add two ints or two floats, but not an int and a float.

The list in Appendix III gives a general description of the quad operators. The specific types which an operator can take are given in the table which follows.

D. General Pseudo-Instructions

A block is an unnamed scope in the source program. Blocks are entered by falling into them. They are never called and take no parameters. However, since blocks can have their own automatic variables, they need to be identified in the Phi-code TM.

The Phi-code TM calling mechanism provides a very general scheme from which diverse implementations are possible. The same calling sequence is used to call both user-defined routines and predefined routines (e.g., sin, abs, printf). For a particular language, certain quads will never appear (e.g., q_unparam in C.). For certain target machines, no code is generated for some quads (e.g. q_save on a registerless machine).

Since some languages require a proliferation of runtime calls (e.g. BASIC), there are many quads whose sole purpose is to compact typical calling sequences.

Phi-code TM Manager Module

The Phi-code TM manager module (qman.c) manipulates Phi-code TM files and provides routines to access each quad. A Phi-code TM file may be constructed, modified, or accessed. In addition, a Phi-code TM macro header file (qmac.h) is provided for inclusion by any routine which calls Phi-code TM manager routines. This file contains typedefs and defines for the q and qcb values described in this document. For example, the names of the q_xxx operators listed above are defined as small integers in this module.

Since various applications need to perform radically different operations on a file, two different file formats, sequential and linked, are provided. The sequential format Phi-code TM file is suitable for accessing Phi-code TM quads in a sequential or direct manner. Direct seeks to a given ordinal are fast. The linked format is useful if insertions and deletions of quads are to be done in the file. Sequential reads may also be performed but direct reads are not allowed. Utilities are provided for translating between file formats.

It is expected that a Phi-code TM file will have sequential format. This may be used directly by the code generator or the interpreter. The optimizer, which must perform insertions and deletions, will read in a sequential format file and create (and modify) a linked format file. The linked format file may be used directly by the code generator.

When constructing or modifying a file, only one file may be open at a time. However, it may be necessary to have several Phi-code TM files open at once (for example, the Interpreter). Therefore, the user of this package must build a Phi-code TM 'control block' for each open file and supply a pointer to this block on certain access calls. When accessing Phi-code TM files, there is a concept of the 'current file'.

When creating, modifying, or accessing a file, there is a concept of the 'current quad'.

The AST file is translated into a subset of the Phi-code TM statements shown in Appendix III. The mapping between particular AST entries and Phi-code TM is constrained by the semantics of the source code language, but bears overall similarities from one language to another. The actual creation of Phi-code TM files is driven by the compiler program under control of a program written for the source language (i.e., the language to be compiled).

F. File Construction

This section lists the routines that are used in creating new Phi-code TM files.

1. venture q_create (*char, char, short)

Create a new Phi-code TM file of the given name. The format of the file is specified by the second argument: 's'=sequential, 'l'=linked. The third argument specifies which source language this Phi-code TM file came from. The code is one of the following:

---
q_srcC (for C)
q_srcPLI (for PL/I)
q_srcCBASIC (for C-Basic)
q_srcF77 (for FORTRAN 77)
q_srcCOBOL (for COBOL)
q_srcPASCAL (for Pascal)
      (for RPG)
      (for ADA)
      (for Modula-2)
---

2. proc q_new(qop_type)

Start construction of a new quad. The old quad (if there is one) becomes inaccessable and the new quad is current. The argument is the opcode of the new quad— This is one of the q_xxx values given in the list and table above. The line and column entries must be set before another q new is performed as well as any Fields which must be set (according to the operator). The start and end values are assumed to be false unless set otherwise.

3. proc q_sopcode(qop_type)

Resets the opcode of the current quad to the code given in the argument.

4. proc q_sop(int, *blk_type)

Set Field n (1, 2, or 3) of the current quad to the supplied block table marker. A pointer to the block table marker (containing the block table index and block table displacement) is passed. The indirect value is assumed to be false and the live and use values are given a default value of true.

5. funct blk type *q_rop(int)

Returns a pointer to the block table marker for the operand of the current quad specified by the argument. This routine is identical in purpose to the q_op( ) routine described below, except that this must be used exclusively when creating files and q_op( ) is used exclusively when accessing them.

6. proc q_sind(int, bool)

Set the use value of operand Field int to the boolean value. Note that this must be done after a q_sop call.

7. proc q_suse(int, bool)

Set the use value of operand Field n to the boolean value. Note that this must be done after a q-sop call.

8. proc q_slit(int, int)

Set the value of the Field specified by the first operand to the value given in the second operand.

9. proc q_sstart(bool)

Set the start value of the current quad to the boolean argument.

10. proc q_send(bool)

Set the end value of the current quad to the boolean argument.

11. proc q_slocation(unt, unt)

Set the line (first arg) and column (second arg) of the current quad.

12. proc q_sdupl(unt)

Set the duplication field of a data quad.

13. proc q_scount(int)

Set the count field of the current data quad.

14. proc q_sdatabuf(*byte)

Set the ten byte data field of the current data quad to the ten bytes pointed to by the argument.

15. venture q_crclose( )

Close the Phi-code TM file currently being created.

G. File Access

Phi-code ™ files are accessed through a Phi-code ™ control block ("pcb"). A pcb is allocated by the caller and a pointer to it is passed to the file access routines as required. However, the caller should never interrogate the pcb data structure directly. Calls to manager routines are used to obtain such information. The caller may maintain many open Phi-code ™ files. The limit is six less than the number of open files allowed in the operating system being used.

There is a concept of the 'current' quad file and the 'current' quad. Whereas most information about the current quad is obtained from routines, some information is maintained in global variables. The following are the global variables used:

| | | |
|---|---|---|
| qord-type | quadcount | The number of quads in the current file. |
| qop_type | qopcode | The opcode of the current quad. |
| qord_type | qordinal | The ordinal of the current quad. |
| qline_type | qline | The line number of the current quad. |
| qcol_type | qcolumn | The column number. |
| bool | qstart | The value of the start bit. |
| bool | qend | The value of the end bit. |

File access routines will now be listed 1. venture q_open(*char, *pcb)

Open an existing Phi-code ™ file for access and make it the current file. There is no current quad.

2. proc q_current(*pcb)

Make the Phi-code ™ file specified by the supplied pcb the 'current' file. All other file access routines in this section assume the current file. Note that, after a q_open or q current is issued, a q_get must be done to position the file.

The following routines retrieve information from the file header. These calls can only be made after a q_open and before a q get or q_current call is made.

3. funct short q_srclang( )

Return the source language of the current file. This is a one of the q_srcXXX codes described previously.

4. funct char q_format( )

Return the format of the current file.

5. funct *char q_qver( )

Return a pointer to a string which gives the version number of the Phi-code ™ manager under which this file was created.

6. funct long q_crdate( )

Return the number of seconds which elapsed from 00:00:00 GMT Jan. 1, 1970 (hereafter—the Zero Date) to the creation of the file.

7. funct *char q_moddate( )

Return the number of seconds from the Zero Date to the last modifiication of the file.

8. proc q_get(unt)

Make the quad whose ordinal is specified by the argument the current quad. q_get(0) moves to the first quad in the file. The values of the global variables are set. If the file is positioned past the end of the file, q_opcode has the value q_eof and the other variables are undefined.

9. funct int q_getnxt( )

Position to the next sequential quad and return the ordinal of this quad. The global variables are set as for q_get.

10. funct *blk_type q_op(int)

Return a pointer to the block table marker for the Field specified by the argument (1, 2, or 3). The values of the components of the pointed to structure must be copied out immediately after this routine returns.

11. predicate q_ind(int)

Yields the boolean value of the indirect flag for the Field specified by the argument.

12. pre dicate q_use(int)

Yields the boolean value of the use flag for the Field specified by the argument.

13. funct int q_lit(int)

Return the integer literal value in the Field specified by the argument.

14. funct unsigned int q_dupl( )

Return the value of the duplication field of the current data quad.

15. funct int q_dcount( )

Return the value of the count field.

16. proc q_databuf(*byte)

Fill the ten bytes pointed to by the argument with the contents of the ten byte data field in the current data quad.

17. proc q_acclose( )

Closes the currently accessed file. The current file can no longer be accessed and the pcb may be re-used on another file. Since no file is current after a q_acclose, a q_open or q current must be issued.

File Modification routines follow.

A single file may be opened for modification. It must be linked format.

18. venture q_modify(*char)

Open a file for modification. The file name is given by the argument.

Once the file is open, the following operations may be used to access quads:

q_get,
q_getnxt,
q_op,
q_ind,
q_use,
q_lit,
q_dupl,
q_dcount,
and q_databuf.

Also, the following routines may be used to modify the fields of the current quad:

q_sop,
q_slit,
q_sind,
q_suse,
q_sstart,
q_send,
q_sdupl,
q_scount,
and q_sdatabuf.

19. proc q_sopcode(qop_type)

Sets the opcode of the current quad to the code given in the argument. Note that, after changing the opcode of a quad, the contents and number of fields needs to be set correctly, according to the quad.

20. proc q_insert(short)

Insert a quad after the current quad with the supplied opcode. The new quad becomes the current quad.

21. proc q_delete( )

Delete the current quad. The next sequential quad becomes the current quad.

22. proc q_modclose( )

Close the modified file.

H. Phi-code ™ File Formats

This section specifies the disk file format of sequential and linked format files.

The first section of a Phi-code ™ file contains information about the file. This section, called the header section, contains the allowing fields, in order:

a. File format: a single character: 's'=sequential, 'l'=linked.

b. File ID: The 18 character string: "The Philon System".

c. Version of the Phi-code ™ manager which created the file. This is a 5 character string of the form "x.xx".

d. Creation time: 4 bytes which give the number of seconds which elapsed between the Zero Date and the creation of the file.

e. Time of last modification: 4 bytes.

f. Quad count: Two bytes which give the count of quads in the file.

g. Identity of source language a single byte which contains the code of the source language h. The remainder of the file contains quads.

1. Sequential Format

All quads are stored in variable length fields. This section describes the format of storage for operational quads. The format of data initialization quads has been described previously.

The first byte (byte 0) contains the operator code. This is followed by a pair of bytes which contain the line number as an unsigned 16-bit integer quantity. The high-order bit of the following byte (byte 3) is set whenever the first operand is a stack operand; the column number is specified by the low-order 7 bits of the same byte. A column value of 1 indicates the first column in the source code.

Following the column is an exec count/break count of 16 bits for labels only.

Bit 0 of byte 4 is set if the third operand is a stack operand. Bit 1 is set if the second operand is a stack operand. The remainder of byte 4 contain the indirect and use bits for the 3 operands (top for first operand).

Up to three Fields follow, each requiring 3 bytes The block index is given in the first byte and the block displacement is stored in the next two bytes.

The format of a quad is summarized:

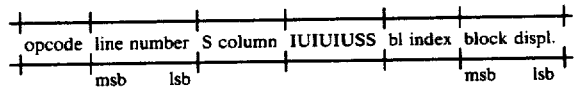

If a field contains a literal, the value of the literal is stored in the first two bytes of the field. The last byte of a literal field is unused.

2. Linked Format

The format of quad storage in linked format is identical to that for sequential storage. However, each quad has two additional link fields which point to the disk address (byte offset from the start of the file) for the preceeding and subsequent quad. Each link field requires three bytes. These two fields follow, in order, after the basic 14 bytes for the quad.

III. SYMBOL TABLE

The term "symbol table" refers collectively to three objects: the hash table, the name table, and the block table.

The block table (often called synonymously the "symbol table") is the main source of information concerning user-defined and pre-defined items in a source program. It is created and used by the passes of a Philon System compiler.

Two other tables are also used. One of these, the "hash table", results from a mapping from the item's name to an integer. This integer gives the location of the item in the hash table and provides a quick access to the item. An entry in the hash table consists of a "block table marker", which gives the location of the symbol table entry for the item, and a "names table marker", which gives a similar location in the name table, described below. Thus the hash table serves essentially as a an index to the item's information contained in the symbol and name tables.

The "name table" is simply a list of the names of all relevant items in the program, terminated by nulls. This is the only piece of information contained here.

The symbol table is created during execution of the first pass of the compiler. Here a standard symbol table containing all pre-defined entries (such as run-time procedures and built-in types) is simply copied. No new entries are made during this pass. The second pass actually creates the symbol table, making entries for objects and types encountered in the source program. The allocator will fill in certain fields of entries, such as their size and offsets. The table will now be used by the code generator or the source debugger.

A. FORMAT OF THE SYMBOL TABLE FILE

The symbol table file resides on the disk and is paged in to memory during execution of a pass of the compiler. The file itself consists of arbitrarily many pages of 512 bytes each. Each block of the symbol table (see below to one or more pages of the file.

The first page (page 0) of the file is the file header, which contains several fields. Field 0 is a single character which gives the status of the file (a blank means "file OK"; anything else means "file corrupt"). Field 1 is the string "The Philon System". Field 2 is a string containing the version number of the symbol-table manager module. Fields 3 and 4 each contain 4-byte long integers which are time stamps in UNIX System format. The first time stamp is the file creation date, the second is the date of last modification. Fields 5 and 6 each contain 2-byte integers, the first of which is the file block count, the second the file page count.

... Field 2 ... Field 3

Page 1 of the block-table file is the first page of a variable-length directory called the Block Directory (BD). This directory gives, for each block in the table, the block table markers of the first and last entries of the block (both are zero if the block is empty). A block table file is initialized with one page devoted to the BD, but more pages can be allocated for this purpose if the size of the table demands it. The first two bytes of each page of the BD contain a forward link to the next page allocated to the BD (zero means no next page). The second two bytes are unused, to permit an integral number of four-byte entries for each block to fit on each page of the BD.

"Normal" pages of the block table contain the entries. However, the first six bytes contain special information. The first two bytes are the block table marker of the first entry of the next page allocated to this block (zero means no next page). The next two bytes are the block table marker of the last entry of the previous page allocated to this block (zero means no previous page). The fifth and sixth bytes contain the block index of the block to which this page belongs.

B. THE SYMBOL TABLE AND BLOCK STRUCTURE

The symbol table was designed with the implementation of block-structured languages in mind. Each time a new scope is encountered, a new "block" is created. Entries local to this scope are put in this block. When an item is searched, the search proceeds from the innermost block out. Several items in the symbol table may thus exist with the same name. At the end of a scope the innermost block is "popped". If several items in the symbol table have the same name, these are chained together using a field in the entry. The hash table, through which access is made, will always point to the visible entry. This entry will in turn contain in its "back chain" field a pointer to the entry it has hidden. Thus, when a block is popped, the hash table can be restored to once again point to the entry momentarily hidden.

C. FORMAT OF AN INDIVIDUAL ENTRY

In general, an entry in the symbol table is either an object or a type. Certain fields are common to objects and types. These include:
   the size in the symbol table of the entry;
   its visibility;
   its hash table location;
   the size of the object or type;
   alignment information;
   a block table marker for another entry of;
   the same name; and
   whether this item is an object or a type All entries for objects have the same size. They contain the following fields:
   a block table marker for its type;
   whether or not the item is constant;
   the address of the object;
   a trap or register allocation flag; and
   initialization information Entries for types, on the other hand, may vary considerably in size and the amount of information they contain. Each type entry contains a field, called its "base type". Depending on its base type, it may contain other fields. For example, an entry with base type "array" will contain a field which gives the element type of the array and another field which will give bound information, etc.

D. NOTATION FOR DESCRIBING ATTRIBUTES

Each piece of information in the symbol table is called an attribute. We describe all of these below. The format we use can be illustrated by a sample entry.

nature (ntr) (at—type)

Is the item an object or a type? Possible values:
   at—obj: an object
   at—typdf: a type This attribute gives the "nature" of the item. Below we explain this simply means whether it's an object or a type. The first item in parentheses is the "abbreviation" of the attribute itself (at-type means "attribute type"). If the possible values of the attribute are limited, these are enumerated below: here we see the nature can only be "at—obj" or "at—typdf".

Abbreviations are used in giving the attributes values and in obtaining their values. In general, if "abbr" is the abbreviation of an attribute, to set this field in the entry whose block table marker is "btm", one would write st—abbr(btm, value)

That is, calling the routine "st—" followed by the abbreviation will set this field to the value "value". To retrieve this value, one can write abbr—of(btm)

where the routine abbreviation followed by "of" is a function returning the value of the appropriate attribute.

However, if the type of the item is "bool" (either true or false), the routine "abbr—of" is called instead "is—abbr" so one writes is—abbr(btm)

which returns true or false.

E. ATTRIBUTES COMMON TO ALL ENTRIES 1. visibility (vis) (at—type)
   The visibility of an item. Possible values are:
      at—loc: local—visible in this module only
      at—imp: imported—actually defined in another module but can be referenced here
      at—exp: exported—defined here and can be accessed on an other module 2. alignment (algn) (int16)
   Alignment necessary for this item. At present, only two bits are allocated for this field, so the value can therefore be 0, 1, 2, or 3.
      0: no alignment necessary
      1: byte alignment
      2: double byte alignment
      3: quad byte alignment 3. object size (osize) (unt32)
   The actual size to allocate for this object or for an object of this type. Note that this field is now 32 bits wide. For type entries which are procedures or blocks, this field is used to give the automatic frame size.

4. nature (ntr) (at—type)
   Whether this item is an object or a type. Possible values are:
      at—obj: an object
      at—typdf: a type 5. hash-table marker (htm) (hs—type)
   The location in the hash table of this item. Certain items such as temporaries are unnamed, and so are not entered in the hash table. This field will contain zero for such items.

6. backchain marker (bkchn) (blk—type)
   The block-table marker for another entry in the symbol table which has the same name as this item. As mentioned above under "Block Structure", this field is used to maintain scoping. If no item has the same name (or this is the first entry with this name), this field will be zero.

7. block index (bkdx) (bindx—typ)
   The block number of the block in which this entry resides. Each scope (block) of the program is given a unique number. This value is actually not contained in the symbol table entry for the item itself, but is rather computed from the block table marker.

F. ATTRIBUTES FOR OBJECTS 1. storage class (stcl) (at—type)
   When and where does this object live?

Possible values are:
 a. at_stat: static—lives forever (one copy only)
 b. at_auto: automatic—lives on the stock, created when local block is entered
 c. at_reg: register—like automatic, but user has instructed to keep in register as much as possible (essentially treated like automatic, as we do our own register allocation)
 d. at_comm: common—lives statically, in a COMMON block (FORTRAN).
 e. at_eqv: equivalenced—it lives in a location relative to another object. The "equivalence link" field gives the symbol table entry of the item it is equivalenced to. The "equivalence offset" field gives its relative displacement to or from this latter item.
 f. at_base: based—does not live until explicitly allocated in the program. The "base pointer" field points to the block table marker for a pointer which will point to this item after allocation. References to this object are through this pointer.
 g. at_cntr: controlled—similar to based (PL/I only). Not implemented.
 h. at_temp: temporary—like automatic, but results from intermediate calculations, rather than being user-defined. Identifies the object as a temporary.
 i. at_stemp: static temporary—a temporary for languages like FORTRAN, BASIC, and COBOL, where all items live statically.
 j. at_prm: parameter—a formal parameter to a procedure. Allocated upon entry to the procedure (below frame).
 k. at_regprm: parameter which is instructed to keep in a register ('C' only).
 l. at_fbuff: this item is the buffer for a file—it has static allocation. The initialization area for the entry is used to indicate the file it is the buffer for, and the next buffer (if any other) for the same file.
 m. at_nost: no storage—no space required for this item. Procedures and labels have this storage class.

2. equivalenced item (eqlk) (blk_type)

Applies only if the object has storage class "eqv". This is the block table marker of the object to which it is equivalenced.

3. equivalence offset (eqoff) (int16)

Applies only if the object has storage class "eqv". This is the offset (plus or minus) relative to the equivalenced item which determines exactly where in memory this object should be allocated.

4. file to which I am buffer (tofile) (blk_type)

Applies only if the object has storage class "fbuff". This is the block table marker of the file which this object is the buffer for. User in deciphering references of the form FILE-BUFFER OF FILE-NAME in COBOL.

5. next file buffer (nxtbuf) (blk_type)

Applies only if the object has storage class "fbuff". This is the block table marker of the next file buffer for the same file.

6. is a constant (const) (bool)

Is this item a constant? Values are:
 true: is a constant
 false: is not a constant 7. is pre-defined (pdef) (bool)

Only applies to procedure objects. Is this a pre-defined (built-in) or user-defined procedure? Values are:
 true: is pre-defined
 false: is user-defined 8. is referenced (refd) (bool)

Only applies to procedure objects. Is this procedure actually called in the program? Used for pre-defined procedures, so that only required run-time routines are actually linked. The storage allocator also uses this item to indicate "forward references" in the generation of storage directives. Values are:
 true: is referenced
 false: is not referenced 9. address (addr) (unt32)

Only applies to objects whose storage class is static. Value contains the location where storage for this object starts, relative to the starting point of some area.

10. offset (ofs) (int32)

Only applies to objects whose storage class is automatic, parameter, register, or temporary. Its value is zero or positive for objects allocated in the automatic area of a stack frame and zero or negative for parameters.

11. kind of initialization (kdin) (at_type)

The kind of initialization supplied for this object. Valves are:
 a. at quad: initialization is in q-code (see attribute "q-code pointer")
 b. at_name: initialization is in name table (see "name pointer")
 c. at_intlt: initialization is an integer (see "integer value")
 d. at_untlt: initialization is an unsigned integer (see "unsigned integer value")
 e. at_lblt: initialization is a label value (see "lavel value")
 f. at_strlt: initialization is a string (see "string value")
 g. at_chrlt: initialization is a character (see "character value")
 h. at_desc: initialization is a descriptor for some dynamic run-time object and is given a standard initialization.
 i. at_ptlt: initialization is for a pointer to be set to the address of a data object, possibly modulo some offset (see "pointer value" and "pointer offset")
 j. at_cxlt: initialization for a complex data item (FORTRAN; see "complex—real value" and "complex—imaginary value")
 k. at_figlt: initialization is a figurative constant (COBOL). The high-order 3 bits of the initialization give the number associated with each figurative constant (1 for ZERO, 2 for SPACE, etc.). The remaining 29 bits supply the length of initialization required.
 l. at_allfig: an initialization of the form ALL "string" (COBOL). The high-order 16 bits of the initializationn give the names table marker for the string, and the low-order 16 bits give the length required.
 m. at_biglt: this initialization will appear only within q-code. Similar to 'ptlt', except the block table marker of the object addressed is in the low-order 16 bits of the associated initialization value, and the offset is the entire 32-bit initialization value following quad.
 n. at_none: no initialization 12. q-code pointer (qdpt) (qord—typ)

A pointer (actually the byte offset) to a quadruple in the q-code file. Applies when kind initialization=at—quad 13. integer value (invl) (int32)

The integer initialization value. Applies when kind initialization=at—intlt 14. unsigned integer value (unvl) (unt32)

The unsigned integer initialization value. Applies when kind initialization=at—untlt 15. float value (ftvl) (nm—type)

A name table index. Applies when kind initialization=at—name 16. label value (lbvl) (qord—typ)

A q-code pointer to the "label" quadruple for this label. Effectively the location of this label in the intermediate code. Applies when kind initialization=at—lblt 17. string value (stvl) (nm—type)

A name table index, providing access to the string. The string is enclosed in quotes. Applies when kind initialization=at—strlt 18. character value (chvl) (char)

The ASCII value of the character which is the initialization. Applies when kind initialization=at—chrlt 19. pointer value (ptvl) (blk—type)

The block table marker of the object whose address is to be the initialization of this item (which is a pointer). Applies when kind initialization=at—ptlt. See the next entry, "pointer offset".

20. complex—real value (cx1) (nm—type)

The real part of the initialization of a complex data item. It is a name table marker for the representation in characters of the value. Kind of initialization=at—cxlt 21. complex—imaginary value (cx2) (nm—type)

The imaginary part of the initialization of a complex data item. It is a name table marker for the representation in characters of the value. Kind of initialization=at—cxlt.

22. bcd value (bcd) (nm—type)

The initialization value for a BCD data item (with base type=at—bcd). It is a name table marker giving the string representation of the value. Kind of initialization=at—name.

23. type (tref) (blk—type)

The block table marker for the type entry which is the type of this object.

G. ATTRIBUTES OF TYPE ENTRIES

Unlike objects, type entries vary greatly in the fields they contain. The most significant attribute of a type entry is its "base type", which might be integer, float, array, structure, procedure, or many other things. Depending on the base type, the entry will contain other fields.

Type entries in general can be sure of containing only one other attribute, which is:

1. examined (exam) (bool)

Has this entry already been looked at by the storage allocator?0 The allocator processes object entries in order, but only processes type entries when an object of that type is found. By setting this field to true, the allocator avoids unnecessary processing, as well as infinite loops. Values are:
 true: has been processed
 false: has not been processed 2. base type (bsty) (at-type)

The fundamental characteristic of this type. Says what kind of animal this type is. The remaining attributes this entry may have depend on the base type.

The continuation of the description of the symbol table appears in Appendix 2.

IV. Back Ends of Compilers According to the Present Invention

The third pass of the compiler 14 is responsible for memory allocation. This program operates by examining each entry in the symbol table, and assigning a memory location to it. In determining the amount of memory space to be allocated to a particular entry, consideration is given to the entry's attributes, as contained in the symbol table. Examples of attributes considered are type, storage class, whether the entry is exportable, and whether its location is determined automatically relative to some internal frame of reference.

The output of the memory allocation phase consists of additional entries in the symbol table which indicate where entries will be stored in memory after compilation is complete, as well as assembly language directives for implementing this storage.

The Code Generator is the fourth 18 part of this compiler. This program module is responsible for generating assembly language instructions 20 from the intermediate language, the Phi-code TM quads in the preferred embodiment, and the symbol table created in the semantics pass.

The Code Generator operates by identifying the assembly language instruction required to implement a corresponding line of Phi-code TM. This is accomplished by creating look-up tables containing pointers to the appropriate assembly language instruction.

Since different labels and identifiers will appear in the second and third fields of the Phi-code TM instructions, for every source code program, the variable and label entries in the assembly language instructions in the code generator tables must be left incomplete. These incomplete instructions function as templates. When a particular assembly language instruction is required, the op-code and number of operands are determined from the stored template form; the operands are determined from the symbol table. Subroutines, known as machine dependent routines, or MDR's perform the task of completing the assembly language templates.

For example, in the case of integer addition, the sum of two integer variables is obtained and stored in a location assigned to a third integer variable. A possible source code statement written in FORTRAN would be $$I = J + K \qquad \text{(eqn 7)}$$

This would be translated into a series of intermediate language, statements, Phi-code TM in the preferred embodiment the exact statements depending upon how the independent variable J and K receive values. The Phi-code TM statement for integer addition, however, is simply $$q\_plus\ J\ K\ I \qquad \text{(eqn 8)}$$

where the operand fields have been assigned the labels from the source code program. Assuming that the target machine utilizes a PDP-11 instruction set, the assembly language instructions produced by the Code Generator for eqn 8 would be $$mar\ J,\ R\ 0 \qquad \text{(eqn 9)}$$

$$ADD\ K,\ R\ 0 \qquad \text{(eqn 10)}$$

MOV RO, I (eqn 11)

The Code Generator tables, referred to earlier, are used in like fashion to retrieve corresponding assembly language templates for each line of Phi-code ™ in the intermediate program. The actual templates fetched by the Code Generator manager would not include the variable labels shown in the above example; these would be obtained from the symbol table by the MDRs.

The fifth part of the compiler is an assembler 24. As is customary, the assembler converts assembly language statements 20 created by the code generator into executable machine language statements 26. The output of the code generator consists of a file of opcodes and operands, specified in ASCII code, appropriate for the target machine. These must be converted into binary code by the assembler.

The actual operation of the assembler consists of examining each line of assembly language 20, identifying the op-code portion, then locating the corresponding machine language equivalent in a table, together with permissible arguments (operands) for the opcodes. The operands in the assembly language statement are then checked against the table entries to determine whether they are permissible and, if so, translated into binary.

The output of the assembler is a translation of the source program into object code 26, in machine language form. This concludes the process of compilation.

V. Optimization Techniques in Compilers According to the Present Invention

As mentioned previously, and as shown diagramatically in FIG. 1, there are measures which may be taken to "optimize" the object code produced by a compiler operating according to the present invention.

Listed below are the optimization techniques employed by the optimizer. Techniques are identified as faster and/or smaller to show how they improve the program. A deliberate attempt has been made to explain these techniques in simple, easy-to-understand terms.

A. Code Elimination

There are two ways of eliminating useless code: forward elimination, which removes code that can never be executed, and backward elimination, which removes code that even if executed would perform no useful function.

An example of useless code is the middle statement of the following BASIC program:

```
    GOTO 30
    PRINT "UNREACHABLE"
30  END
```

The statement after a GOTO is always a potential candidate for being unreachable.

These situations occur only rarely in source code. However, they often arise after other optimization techniques have been applied.

1. Forward Elimination

The optimizer uses three techniques to identify code which can never be executed. They are listed in order of increasing thoroughness:

a. Unlabelled Code Elimination (smaller)

As in the BASIC example above, the optimizer can eliminate code that is always bypassed and never branched to. This technique removes code which follows a GOTO and has no statement number or label.

b. Unreferenced Code Elimination (smaller).

Even if the middle statement in the example did have a statement number, it still would never be executed. This technique removes code which has a statement number or label that follows a GOTO, but which is never the destination of a GOTO statement elsewhere in the program.

c. Unreachable Code Elimination (smaller).

Finally, suppose there was a GOTO statement which GOes TO the middle statement in the example. If that GOTO statement itself can never be executed, then neither will the middle statement, and we can eliminate both of them. This technique removes disconnected subgraphs of the program's flow graph.

2. Backward Elimination a. Dead Variable Elimination (faster, smaller).

Most of the computations of a program are performed in the computer's registers, and are then stored in variables in the computer's memory. If the result of a computation is used while it is still in a register, there is no need to store it into memory. This technique removes the code which stores variables which are dead on exit from a basic block.

b. Dead Computation Elimination (faster, smaller).

If the result of a computation is never used at all, the code that computes the result can be eliminated as well as the code that stores the result in memory. This technique uses du-chains to remove code that computes and stores a result that has no next use in the current basic block and is dead on exit.

c. Dead Code Elimination (faster, smaller).

This technique removes code that has no effect on the output of the program. For example, in a routine which calls no other routines, we can eliminate a computation which cannot affect any global data, output statements, or the return value of the routine.

B. Register Allocation

Computations may be performed either in the computer's register or in its memory. The code will be faster and smaller if it uses the registers as much as possible, and avoids unnecessary movement of data between the registers and memory.

Unfortunately, there are usually more variables in a program than registers in a computer. In addition, there are some languages which do not permit certain variables to reside in the registers. For example, variables whose addresses are taken in the language C must be located in memory. Whenever possible, the present invention allocates the limited number of registers to the most frequently used variables in the program.

1. Local Register Allocation (faster, smaller).

Let the result of a computation stay in a register to make it more accessible for future use. For example, the result of the two multiplications shown below will be used immediately by an addition.

PRINT A*B+C*D

Therefore, the two products are kept in registers, rather than moving them into memory and back.

2. Local Register Allocation with Next-Use Information (faster, smaller).

In the above example, the optimizer holds the products in two registers for use by the addition. Next-use information allows allocation of the two registers for new purposes after performing this addition. This technique immediately signals when used information is no longer needed in the valuable registers.

3. Available Register Allocation (faster, smaller).

The above techniques allow the optimizer to remember only for a short period (within a basic block) the valuable results that are held in the registers. Available Register Allocation is a technique for keeping track of the contents of the registers, and eliminating the code to move a value from memory into a register when the value is already there. At the start of each basic block, the register descriptors are initialized to the intersection of the register descriptors at the end of each predecessor block.

4. Loop Based Register Allocation (faster).

This technique keeps the induction variables of loops in a register. For example, the variable I is accessed each time the loop is executed,

```
FOR I = 1 TO 1000
...
NEXT I
``` so the optimizer keeps it in a register to avoid having to move it there from memory a thousand times.

5. Base Register Allocation (faster, smaller).

There are two ways (or addressing modes) that an instruction can access a variable in memory. The instruction can specify the variable's memory address, or it can specify a register that holds the variable's memory address. The code will be faster and smaller if it uses the second addressing mode as much as possible.

This technique allocates a base register to hold the address of frequently accessed variables. Note that a single base register can access many static variables in the same segment of memory.

C. Code Motion

A program can often be made faster and smaller by rearranging the order of the instructions. These optimizations need the Flow Graph, Data Flow information and, possibly, Chaining information.

1. Code Hoisting and Sinking (smaller).

Sometimes the same piece of code occurs in different places in a program. Hoisting and sinking are techniques for removing repeated pieces of code and replacing them by single copy at one strategic point. Hoisting inserts the single copy at a point before all the places where the code was before; sinking inserts the single copy at a point after all the places where the code was before. More techinically, if a piece of code appears at the head of each successor of a basic block, the optimizer hoists the code out of the successors, and replaces it by a single copy at the tail of the basic block. Sinking is handled similarly.

2. Branch Minimization (faster, smaller).

This technique moves the sections of the program around so that fewer GOTO's are necessary from section to section. It topologically sorts the basic blocks of the program.

3. Code Juxtaposition (faster).

Code that is within a loop is executed many times; code outside of a loop is executed once. This technique moves instructions out of a loop so that fewer instructions will be repeatedly executed. For example, consider the BASIC WHILE loop:

```
WHILE(A = B)
...
WEND
END
```

The loop may be translated into the following three instructions:

```
1 if a<>b then goto 4
2 ...
3 goto 1
4 end
```

After code juxtaposition, the loop contains only two instructions.

```
1 goto 3
2 ...
3 if a=b then goto 2
4 end
```

4. Constant Propagation and Folding (faster, smaller).

If the optimizer can predict the value of a variable in a given statement, it will generate code which contains the variable's value instead of its memory address. This eliminates the need for code that copies the value from memory into a register. In addition, if the optimizer can predict the result of a computation, it will generate code that uses the result without performing the computation. Finally, knowing the values of variables can sometimes allows prediction of whether an IF statement is true or false, allowing an opportunity for Forward Elimination. (See Section A.)

5. Available Expression Elimination and Very Busy Expression Hoisting (faster, smaller)

Are two techniques for replacing many similar computations by a smaller number of computations. The results of the replacement computations are stored in variables which are used in place of the deleted computations. Technically, if an expression is available in a basic block (i.e., computed on all paths into the block), the optimizer stores the value into a temporary variable as soon as it is computed. Similarly, if an expression is very busy in a basic block (i.e., computed on all paths out of the block), the optimizer hoists its computation into the basic block and stores the value into a temporary variable. In both cases, the optimizer accesses the temporary instead of recomputing the expression whenever there has not been a reassignment to the operands of the expression.

6. Loop Invariant Code Motion (faster).

Instead of performing the same computation over and over inside a loop, perform it once before the loop begins. For example, in this BASIC program,

```
FOR R=1 TO 3
PRINT "CIRCUMFERENCE IS"; 2 * PI * R
NEXT R
``` the multiplication of 2*PI yields the same product during each loop, so the optimizer needs to compute it only once.

7. Loop Unrolling (faster).

In the above example, the program divides its time between the PRINT statement and the FOR/NEXT statements which serve only to repeat the PRINT statement. The FOR/NEXT statements are eliminated simply by producing three translations of the PRINT statement.

```
PRINT "CIRCUMFERENCE IS"; 2 * PI * 1
PRINT "CIRCUMFERENCE IS"; 2 * PI * 2
PRINT "CIRCUMFERENCE IS"; 2 * PI * 3
```

Given a loop which runs a constant number of times (or a multiple of a constant number of times), the optimizer copies the body a number of times equal to some small divisor of the constant. Then each copy can be terminated simply by an update of the index variable rather than by an update of the index variable rather than by an update, test, and branch. Furthermore, if the index variable is not used within the body, the update can be done once (by a larger amount) at the end of the expanded body.

D. Computation Alteration

These techniques make loops smaller and much faster.

1. Induction Variable Strength Reduction (faster, smaller).

Replace computations in a loop which involve the induction variables by faster and smaller computations. This is done by mimicking the computation using an arithmetic progression.

2. Induction Variable Elimination (faster, smaller)

Combine several induction variables where each forms an arithmetic progression into a single induction variable. This is often applicable after Strength Reduction since it generates new induction variables.

E. Control Structure Modification

1. Switch Optimization (faster, smaller).

These techniques generate efficient code for IF and SWITCH statements to optimize time and/or space. Several data structures are possible for code generated for SWITCH, including a lookup table, index table, binary search table, near-perfect hash table, or a combination of conditional logic and some of the above.

F. Miscellaneous

1. Linked Jump Elimination (faster).

In the following BASIC program,

```
10 GOTO 100
20 GOTO 10
```

Statement 20 is translated as if it said GOTO 100. This eliminates unnecessary jumping around. Such situations often occur as a result of other optimizations.

2. Branch Reduction (faster, smaller).

In native code, a GOTO to a distant instruction in the program takes more time and space than a GOTO to a nearer instruction. All GOTO's are made as fast and small as possible by checking the distance from each GOTO to its destination. Note that shortening one GOTO instruction may shorten the branching distance of another GOTO, allowing opportunities for further improvement.

3. Linking Span Dependent Instructions (smaller).

If one part of a program has many GOTO's to the same distant instruction, the optimizer replaces them all by "short" GOTO's to a single "long" GOTO whose destination is the distant instruction.

G. Peephole Optimization

1. Context Sensitive Peephole Optimization (faster, smaller).

The Philon System translates each statement of the source program into a separate list of native code instructions. The Peephole Optimizer can examine an arbitrarily large section of code, including instructions that were generated from separate source statements. It merges together instructions generated from adjacent statements, to take advantage of shortcuts which can not be anticipated during a statement-by-statement translation.

The Peephole Optimizer changes patterns in the code into faster and smaller replacements. It performs context-sensitive pattern matching using a well-designed set of matching primitives are available to detect usage of a register later in the basic block and whether the register is live on exit from the block.

H. Program Level Optimizations

1. In-line Routine Substitution (faster).

In the same way that loops can be unrolled (see Section C), subroutine calls are unfolded by replacing each call by a copy of the subroutine. This frees the program from spending time executing the GOSUB/RETURN statements. Calls to small nonrecursive routines are replaced by the body of the routine, substituting formal parameters by actual arguments.

2. Subroutine Instantiation (faster).

This is a combination of the previous technique with Constant Propagation (See Section C). It is used for subroutines that are frequently called with a constant argument.

3. Macro Compression (smaller).

This is a more thorough technique than Hoisting and Sinking (See Section C) for removing repeated sections of code and replacing them by a single copy. Macro Compression catches repeated sections which are immune to Hoisting and Sinking, and changes them into calls to a subroutine which performs the same function. In the simple case, the synthesized subroutine has no parameters and replaces a constant sequence of instructions. This may be made even smaller by allowing the synthesized subroutine to take parameters so that it can replace different sequences of instructions.

Although the present invention has been disclosed in terms of particular examples and embodiments, it should be clear that the scope of the invention is not limited to these disclosed examples. Rather, as will be readily apparent to one with ordinary skill in this art, many other implementations of the invention disclosed herein are possible.

APPENDIX I

This appendix defines the intermediate form (AST) used as the interface between passes one and two of the Philon COBOL compiler.

| | |
|---|---|
| program: | 'a__cmpunt' iddiv envdiv datadiv procdiv |
| | 'a__endcmpunt' |
| iddiv: | id |
| id: | 'a__id' |
| | <hash value> |
| envdiv: | 'a__envdiv' configsect iosect samearea |
| configsect: | 'a__config' spnames currsign dpcomma |
| spnames: | 'a__begin' switch* 'a__end' |
| | 'a__empty' |
| line: | 'a__line' <line number> <column number> |
| optid: | id |
| | 'a__empty' |
| currsign: | optlit |
| optlit: | lit |
| | 'a__empty' |
| lit: | 'a__lit' <literal 16-bit value> |
| dpcomma: | flag |
| flag: | 'a__yes' |
| | 'a__no' |
| iosect: | 'a__begin' filecontrol* 'a__end' |
| | 'a__empty' |
| samearea: | 'a__begin' areagroup* 'a__end' |

-continued

| | |
|---|---|
| | 'a__empty' |
| areagroup: | 'a__begin' id* 'a__end' |
| filecontrol: | 'a__filedef' line id isopt assigntowhat org fstatus access keys 'a__endfiledef' |
| isopt: | flag |
| assigntowhat: | 'a__text' filename |
| | 'a__binary' filename |
| | 'a__printer' optfilename* |
| | lit |
| optifilename: | filename 'a__empty' |
| filename: | 'a__item' forwardref |
| | 'a__command' forwardref |
| idlist: | 'a__begin' id* 'a__end' |
| | 'a__empty' |
| org: | 'a__seq' |
| | 'a__rel' |
| | 'a__inx' |
| fstatus: | optforwardref |
| optforwardref: | 'a__item' forwardref |
| | 'a__empty' |
| forwardref: | 'a__item' modname |
| | 'a__forward' modname |
| access: | 'a__seqacc' optforwardref |
| | 'a__rndacc' optforwardref |
| | 'a__dynacc' optforwardref |
| keys: | 'a__key' forwardref altkeys |
| | 'a__empty' |
| altkeys: | 'a__begin' altkey* 'a__end' |
| | 'a__empty' |
| altkey: | 'a__altkey' hasdupls forwardref |
| hasdupls: | flag |
| datadiv: | 'a__datadiv' filesect ussect linksect commsect reptsect |
| filesect: | 'a__filesect' fdsds |
| fdsds: | 'a__begin' fdsd* 'a__end' |
| | 'a__empty' |
| fdsd: | 'a__fd' line id fdclauses records |
| | 'a__sd' line id sdclauses records |
| fdclauses: | 'a__begin' fdclause* 'a__end' |
| fdclause: | 'a__recsize' recsize |
| | 'a__labels' flag |
| | 'a__labval' labvallist |
| | 'a__datarecs' idlist |
| | 'a__linage' linage |
| | 'a__reports' idlist |
| recsize: | 'a__pair' name name |
| | name |
| labvallist: | 'a__begin' labval* 'a__end' |
| labval: | 'a__check' forwardref |
| | 'a__wrlab' forwardref |
| | 'a__setlab' |
| | forwardref |
| linage: | forwardref optforwardref optforwardref optforwardref |
| records: | 'a__begin' dd* 'a__end' |
| | 'a__empty' |
| sdclauses: | 'a__begin' sdclause* 'a__end' |
| sdclause: | 'a__recsize' recsize |
| | 'a__datarecs' idlist |
| wssect: | 'a__begin' dd* 'a__end' |
| dd: | 'a__dd' line lit optid dclauses |
| dclauses: | 'a__begin' dclause* 'a__end' |
| dclause: | 'a__redef' modname |
| | 'a__pic' name |
| | 'a__usage' usage |
| | 'a sign' sign |
| | 'a__occurs' range asckeys tabindexes |
| | 'a__just' |
| | 'a__blankzero' |
| | 'a__value' initval |
| | 'a__renames' renamed |
| | 'a__condval' condvallist |
| modname: | 'a__select' modname id |
| | id |
| name: | 'a__name' <names table marker> |
| usage: | 'a__comp' |
| | 'a__display' |
| | 'a__index' |
| sign: | 'a__lead' |
| | 'a__trail' |
| | 'a__slead' |
| | 'a__strail' |
| range: | 'a__varrange' name name modname |
| | name |
| asckeys: | 'a__begin' asckey* 'a__end' |
| | 'a__empty' |
| asckey: | 'a__asckey' ascdesc modname |
| ascdesc: | flag |
| tabindexes: | idlist |
| | 'a__empty' |
| initval: | 'a__fig' lit |
| | 'a__allfig' name |
| | name |
| renamed: | 'a__pair' modname modname |
| | 'a__item' modname |
| condvallist: | 'a__begin' conval* 'a__end' |
| condval: | 'a__pair' id id |
| | 'a__item' id |
| linksect: | 'a__begin' dd* 'a__end' |
| commsect: | stub |
| stub: | 'a__empty' |
| reptsect: | stub |
| procdiv: | 'a__procdiv' line procprmlist restofprocdiv |
| procprmlist: | 'a__begin' procprm* 'a__end' |
| | 'a__empty' |
| procprm: | 'a__prm' modname |
| restofprocdiv: | 'a__declaratives' declaratives sections |
| | 'a__sects' sections |
| | 'a__pargs' paragraphs |
| | 'a__stms' stms |
| declaratives: | 'a__begin' declarative* 'a__end' |
| declarative: | 'a__decl' line para optlit usestate paragraphs |
| usestate: | 'a__useio' useio |
| | 'a__usereport' vbl |
| | 'a__usedebug' stub |
| useio: | 'a__input' |
| | 'a__output' |
| | 'a__io' |
| | 'a__extend' |
| | idlist |
| vbl: | 'a__subscr' modname subs |
| | 'a__fig' lit |
| | 'a__allfig' name |
| | modname |
| subs: | 'a__begin' sub* 'a__end' |
| sub: | 'a__plus' modname id |
| | 'a__minus' modname id |
| | modname |
| sections: | 'a__begin' sections* 'a__end' |
| section: | 'a__section' line para optlit paragraphs |
| paragraphs: | 'a__begin' paragraph* 'a__end' |
| paragraph: | 'a__para' line para stms |
| stms: | 'a__begin' state* 'a__end' |
| state: | 'a__stm' line stm |
| srm: | 'a__libcall' id prms |
| | 'a__excpcall' id flag prms optstms |
| | 'a__call' vbl flag prmlist optstms |
| | 'a__accdisp' id flag optvbl prms optstms |
| | 'a__addcorr' flag vbl rndvbl optstms |
| | 'a__alter' para para |
| | 'a__compute' lit flag expr rndvbllist optstms |
| | 'a__exitprog' |
| | 'a__goto' optpara |
| | 'a__cgoto' vbl lit litlist |
| | 'a__if' condition optstms optstms |
| | 'a__inspect' vbl tally replace |
| | 'a__merge' id asckeys idlist outproc |
| | 'a__move' lit vbl vbllist |
| | 'a__movecorr' vbl vbl |
| | 'a__perform' performed |
| | 'a__perftimes' vbl performed |
| | 'a__perfuntil' condition performed |
| | 'a__perfvar' initlist condlist performed incrlist lastincr |
| | 'a__search' flag optstms vbl optvbl whenlist |
| | 'a__srchall' flag vbl optstms searchcond optstms |

-continued

```
                     'a__set' lit vbl vbllist
                     'a__setup' lit vbl idlist
                     'a__setdown' lit vbl idlist
                     'a__sort' id asckeys inproc outproc
                     'a__string' flag vbl optvbl stringlist
                       optstms
                     'a__subtcorr' flag vbl rndvbl optstms
                     'a__unstring' flag vbl optvbl optvbl
                       delimlist targlist optstms
                     'a__endunstring'
                     'a__addto' addto
                     'a__addgiving' addgiving
                     'a__divinto' divinto
                     'a__divgiving' divgiving
                     'a__rmndr' rmndr
                     'a__multby' multby
                     'a__multgiving' multgiving
                     'a__subtfrom' subtfrom
                     'a__subtgiving' subtgiving
prmlist:             'a__begin' coprm* 'a__end'
                     'a__empty'
coprm:               'a__prm' vbl
prms:                'a__begin' prm* 'a__end'
prm:                 'a__nullprm'
                     'a__nulldesc'
                     'a__numprm' vbl
                     'a__intprm' vbl
                     'a__prm' vbl
                     'a__litprm' lit
                     'a__alfaprm' vbl
                     'a__fileprm' id
                     'a__keyprm' vbl
                     'a__recprm' vbl
                     'a__intoprm' vbl
                     'a__fromprm' vbl
                     'a__startprm'
vbllist:             'a__begin' taggedvbl* 'a__end'
taggedvbl:           'a__vbl' vbl
rndvbllist:          'a__begin' rndvbl* 'a__end'
rndvbl:              'a__rnd' vbl
                     'a__vbl' vbl
optstms:             stms
                     'a__empty'
optmodname:          taggedmodname
                     'a__empty'
modnamelist:         'a__begin' taggedmodname* 'a__end'
taggedmodname:       'a__item' modname
tally:               'a__begin' tallyitem* 'a__end'
                     'a__empty'
tallyitem:           'a__tally' vbl tallywhat beforeafter
tallywhat:           'a__all' vbl
                     'a__lead' vbl
                     'a__chars'
beforeafter:         'a__before' vbl
                     'a__after' vbl
                     'a__empty'
replace:             'a__begin' replaceitem* 'a__end'
                     'a__empty'
replaceitem:         'a__replchars' vbl beforeafter
                     'a__replace' allleadfirst vbl vbl
                       beforeafter
allleadfirst:        'a__rall'
                     'a__rlead'
                     'a__rfirst'
inproc:              'a__file' idlist
                       performed
outproc:             'a__file' id
                       performed
performed:           'a__pair' para para
                     'a__item' para
para:                lit
optpara:             optlit
litlist:             'a__begin' lit* 'a__end'
initlist:            'a__begin' initgroup* 'a__end'
initgroup:           'a__pair' vbl vbl
condlist:            'a__begin' loopcond* 'a__end'
loopcond:            'a__cond' condition
incrlist:            'a__begin' incrgroup* 'a__end'
incrgroup:           'a__incr' vbl vbl vbl
lastincr:            'a__pair' vbl vbl
optvbl:              'a__vbl' vbl
                     'a__empty'
```

-continued

```
whenlist:            'a__begin' when* 'a__end'
when:                'a__when' condition optstms
stringlist:          'a__begin' stringitem* 'a__end'
stringitem:          'a__stritem' vbl delim
delim:               'a__vbl' vbl
                     'a__size'
delimlist:           'a__begin' delimby* 'a__end'
delimby:             'a__delim' flag vbl
targlist:            'a__begin' target* 'a__end'
target:              'a__target' vbl optvbl optvbl
searchcond:          'a__begin' hilocond* 'a__end'
hilocond:            'a__item' hilo
hilo:                'a__eq' vbl expr
                     'a__cond' vbl
expr:                'a__plus' expr expr
                     'a__minus' expr expr
                     'a__mult' expr expr
                     'a__div' expr expr
                     'a__expon' expr expr
                     'a__uminus' expr
                     'a__vbl' vbl
condition:           'a__or' condition condition
                     'a__and' condition condition
                     'a__not' condition
                     'a__gt' expr expr
                     'a__ge' expr expr
                     'a__lt' expr expr
                     'a__le' expr expr
                     'a__eq' expr expr
                     'a__ne' expr expr
                     'a__numeric' a__vbl vbl
                     'a__alphabetic' a__vbl vbl
                     'a__pos' expr
                     'a__neg' expr
                     'a__zero' expr
                     'a__abgt' expr
                     'a__abge' expr
                     'a__ablt' expr
                     'a__able' expr
                     'a__abeq' expr
                     'a__abne' expr
                     'a__vbl' vbl
addto:               'a__begin' lit flag vbllist rndvbllist
                       optstms 'a__end'
addgiving:           'a__begin' lit lit flag vbllist rndvbllist
                       optstms 'a__end'
divinto:             'a__begin' lit flag vbl rndvbllist optstms
                       'a__end'
divgiving:           'a__begin' lit flag vbl vbl rndvbllist
                       optstms 'a__end'
rmndr:               'a__begin' flag vbl vbl rndvbl vbl optstms
                       'a__end'
multby:              'a__begin' lit flag vbl rndvbllist optstms
                       'a__end'
multgiving:          'a__begin' lit flag vbl vbl rndvbllist
                       optstms 'a__end'
subtfrom:            'a__begin' lit lit flag vbllist rndvbllist
                       optstms 'a__end'
subtgiving:          'a__begin' lit lit flag vbllist rndvbllist
                       optstms 'a__end'
```

APPENDIX 2

I. Attributes of Symbol Table (continued)

A. Possible Values for Base Type
1. at__int: integer (medium-size)
2. at__sint: short integer
3. at__lint: long integer
4. at__char: character
5. at__uchar: unsigned character
6. at__flt: floating-point (medium-size)
7. at__sflt: short floating-point
8. at__lflt: long floating-point
9. at__enum: enumeration type
10. at__enmb: member of enumeration
11. at__unsg: unsigned integer (medium-size)
12. at__sunsg: short unsigned integer 13. at_lunsg: long unsigned integer
14. at_pntr: pointer type
15. at_bit: bit field
16. at_arr: array
17. at_strct: structure
18. at_union: union
19. at_string: string
20. at_darr: dynamic array
21. at_bcd: bcd arithmetic type
22. at_blck: a block
23. at_lbl: label
24. at_proc: procedure
25. at_pkg: package B. ATTRIBUTES FOR BASE TYPE at_enum, at_enmb An enumeration type is specified by listing the values an item of this type can take on. The "enumeration list" field of the enumeration type entry points to an "enumeration member" type entry. This first enumeration member has a pointer, the "enumeration object" field, to a constant object of this enumeration type. This object is initialized to zero. Subsequent values in the enumeration each cause an "enumeration member" type entry and a corresponding object entry to be made. The enumeration members are chained together. The objects in turn are initialized to 0, 1, 2, . . .

1. enumeration list (enlst) (blk type)

For an item of base type "at_enum", this field holds the block table of the first "enumeration member" field of the enumeration.

2. enumeration link (enlk) (blk type)

For an item of base type "at_enmb", this field holds the block table marker of the next "enumeration member" field of the enumeration.

3. enumeration object (enobj) (blk type)

For an item of base type "at_enmb", this field holds the block table marker of an object which is the corresponding item in the enumeration.

C. BASE TYPE at_arr, at_ardx

For array types, we must indicate the element type of the array and also the number of dimensions and the range of each dimension. To do this, an array type entry has an "element type" field and an "index list" field. The index list field leads to a type entry of base type "at_ardx".

Array index (at_ardx) types contain two fields. The first (the "index pointer") points to a type entry which gives the range of this dimension. The latter type entry is thus a subrange type or a constrained integral type. The second field is the "index link", and points to the next array index for the array (giving the bounds for the next dimension). If this is the last dimension of the array, the "index link" is zero.

One point: a multi-dimensional array can be represented in two ways. As an array of scalar type with two array indexes, or as an array of element type array with one array index.

1. element type (elty) (blk_type)

For a type of base type "at_arr", this field points to a type entry which is the element (member) type of the array.

2. ex list (inlst) (blk_type)

For a type of base type "at_arr", this field points to an "at ardx" type entry which gives bound information for the first dimension of the array.

3. row or column order (row) (bool)

For a type of base type "ar_arr", this field says whether storage is to be allocated for the array in row-major or column-major order. Values are:
    true: row-major order
    false: column-major order 4. number of elements (nelt) (unt16)

For a type of base type "at_arr", this field provides the number of elements in the array.

5. number of dimensions (ndim) (unt8)

For a type of base type "at_arr", this field gives the number of dimensions in the array.

6. index pointer (inptr) (blk type)

For a type of base type "at_ardx", this field gives the type of the array bound. This type is either a subrange type or a constrained integral type. The actual upper and lower bounds can be found by investigating this type.

7. index link (inlk) (blk_type)

For a type of base type "at_ardx", this field gives the next array index (at_ardx) for the next dimension of the array. If zero, this is the last dimension of the array.

D. BASE TYPE at_strct, at_stfd

Structures or records have base type "at_strct". For such a type, the "field list" attribute points to the first member of the structure, which has base type "at_stfd".

Each structure field type entry has a "field pointer" attribute, which gives the type of the field, a "field name" for its name, and a "field link" field, to get to the next member of the structure. It also contains a "field parent" field, which points back to the structure of which it is a member.

1. field list (fdlst) (blk_type)

For a type of base type "at_strct", this field points to the first structure field (base type "at_stfd") of the structure.

2. number of fields (nfld) (unt8)

For a type of base type "at_strct", this field gives the number of fields in the structure.

3. record block number (rblk) (bindx_type)

For PASCAL and MODULA_2 only. In these languages, a reference to a structure field is of the form "r.f" where r is the record (structure) and f is a field. We regard the reference to "r" as opening up a new block where the fields or r become visible. Thus, in these languages, a new scope is created for each record, and the block number where its fields lie is saved in this attribute.

4. field name (fdnm) (nm_type)

For a type of base type "at_stfd", this field gives the name table marker for the field's name.

5. field pointer (fdptr) (blk_type)

For a type of base type "at_stfd", this field points to the type entry which gives the type of the field.

6. field link (fdlk) (blk_type)

For a type of base type "at_stfd", this field points to the next structure field belonging to the same structure.

7. field parent (fdpar) (blk_type)

For a type of base type "at_stfd", this field points back to the object or structure field whose type is the structure of which this item is a field. This attribute is provided for such languages as PL/1 and COBOL where a field may be referenced without naming the parent.

8. displacement (disp) (unt32)

For a type of base type "at_stfd", this field gives the displacement (offset) of the field from the start of the structure.

E. BASE TYPE at—union, at—unmb
  Unions are similar to structures.
  1. member list (mblst) (blk type)
  For a type of base type "at—union", this field gives the first member of the union.
  2. number of members
  For a type of base type "at—union", this frid gives the number of members in the union.
  3. member name (mbnm) (nm—type)
  For a type of base type "at—unmb", this field gives the name table marker for the member's name.
  4. member pointer (mbptr) (blk—type)
  For a type of base type "at—unmb:, this field gives the type of the member.
  5. member link (mblk) (blk—type)
  For a type of base type "at—unmb", this field gives the next member of the union.
  6. member parent (mbpar) (blk—type)
  For a type of base type "at—unmb", this field points to the block table marker for the objector structure field whose type is the union of which this field is a member, or if the union is anonymous is the immediate enclosing structure.

F. BASE TYPE at—darr
  This means the corresponding object is a dynamic array. As such no further information is available at compile time. The object itself generally has received a standard initialization (at—desc) and will be handled by run-time routines.
  1. element type (elty) (blk—type)—Same as for types with base type "at—arr".
  2. Index list (inlst) (blk—type)—Same as for types with base type "at—arr".
  3. number of dimensions (ndim) (unt8)—Same as for types with base type "at—arr".
  4. row or column order (row) (bool)—Same as for types of base type "at$_{13}$ arr".

G. BASE TYPE at—bcd
  This means the corresponding object is a binary-coded-decimal numeric item. Such a type has two attributes, "number of digits" and "number of decimal places". Actually, this base type was introduced for BASICs, where these attributes are not used, since all such objects have a standard size. However, in PL/I, these fields will be used.
  1. number of digits (dgt) (unt16)—The number of digits represented.
  2. number of decimal places (dcpt) (unt16)—The number of decimal places represented.

H. BASE TYPE at—string
  This indicates the corresponding object is a string. It is used in BASICs only. In CBASIC, only the string itself is allocated (for constant; for variables, a pointer is allocated since the strings are dynamic). In MBASIC, a descriptor consisting of length, pointer to string, and the string is allocated for constants. For variables, space for a length and a pointer are allocated. There is no further attribute for this base type.

I. BASE TYPE at—fstring
  A FORTRAN or PL/I character string. The corresponding object in general has two relevant sizes. The first is the maximal size it can take on. This is the size to allocate. The second is the "logical" size the string has at any given moment at run-time. This is due to varying-length strings in PL/I and to the substringing operation in FORTRAN.
  1. allocated length (alleng) (unt16)
  The allocated length of the string.
  2. working length (wkleng) (blk—type)
  Block table marker of object giving working length of the string.
  3. is varying (vary) (bool)
  Is the string varying in length (PL/I)? If so, an integer must be allocated for the string's length, which is used in run-time routines. Values are:
    true: it is varying
    false: no it's not J. BASE TYPE at—numeric
  A COBOL numeric data item. This has the fields listed below.
  1. length (leng) (unt16)
  The size of the item (in bytes).
  2. decimal places (dp) (int8)
  Number of decimal places of item (can be negative).
  3. sign information (sign) (unt8)
  Tells whether the item is signed or not and the internal representation of the sign. Values are:
    UN: not signed
    LS: sign is leading, separate character
    LN: sign is leading, not separate character
    TS: sign is trailing, separate character
    TN: sign is trailing, not separate character
  4. is computational? (comp) (bool)
  Is this a COMPUTATIONAL data item? If so, will be allocated like a native integer. Values are:
    true: it is
    false: it is not K. BASE TYPE at—numed
  A COBOL numeric edited item with the following fields: length
  1. (leng) (unt16)
  The length of item.
  2. decimal places (dp) (int8)
  Number of decimal places.
  3. picture (pic) (blk—type)
  Pointer to the block table entry for the item's picture (which is passed along with the item to run-time routines). blank
  4. when zero? (bwz) (bool)
  Is the item to appear blank when it has the value zero? Values are:
    true yes
    false: no L. BASE TYPE at—alfnum:
  A COBOL alphanumeric edited item with the fields:
  1. length (leng) (unt16)
  Length of the item.
  2. is justified (just) (bool)
  Is the item right justified? Values are:
    true: yes
    false: no M BASE TYPE at—alfa:
  A COBOL alphabetic item with fields:
  1. length (leng) (unt16)
  length of the item
  2. is justified (bist) bool)
  Is the item right justified. Like above
  3. picture (pic) (blk type)
  Pointer to the block table marker for the item's picture. If the picture is simple (no insertion of blanks), this value will be zero.

N. BASE TYPE at—alfed:
  COBOL alphanumeric edited item. Fields are:
  1. length (leng) (unt16)
  Length of item.
  2. is justified (just) (bool)

Is it right justified? Like above.

3. picture (pic) (blk type)

Block table markeer for picture of item.

O. BASE TYPE at_ _para_

COBOL paragraph or section. The base type "label" is not used because different information must be kept.

1. is a section? (issect) (bool)

Is this a paragraph or a section?
   true: a section
   false: a paragraph 2. parent section (sect) (blk_type)

If a paragraph, the block table marker of the section to which it belongs. If a section or a paragraph in a program without sections, it is 'blk_null'.

3. referenced outside of it section? (extref) (bool)

Has this paragraph been referenced anywhere outside of the section in which it is defined? Values are:
   true: yes
   false: not 4. number of times defined? (dfcount) (unt8)

Number of times a paragraph with this name has been defined. (this and the preceding field are used to check for invalid paragraph references in COBOL.)

5. next paragraph (next) (blk_type)

The block table marker of a pointer which is set to point to the following paragraph. Space for this pointer is allocated, as there are statements in COBOL which change its value (ALTER and PERFORM).

6. saved next paragraph (save) (blk_type)

The block table marker of a pointer which points to the next physical paragraph. This value is used at runtime to restore the value of the 'next' pointer after a return from a PERFORM.

P. BASE TYPE at_cond

A COBOL condition (88-item). This is an item which is either true or false according to whether a referenced item has a given value(s) or range of value(s).

1. referenced object (cndobj) (blk_type)

The block table marker for the object whose value is being inquired. Note that if the object is subscripted, the pointer will be to a temporary.

2. value list (cndlst) (blk_type)

The block table marker for the first condition value against which to test the referenced object.

Q. BASE TYPE at_cndvl

A condition value. This gives the value or range of values against which the referenced object in a condition is tested.

1. low value (locnd) (blk_type)

The block table marker of an object which gives the low value of a range.

2. high value (hicnd) (blk_type)

The block table marker of an object which gives the high value of a range. If the comparison is against a single value rather than a range, the pointer is to the single value and the 'low value' is unused.

3. is a single value? (sngl) (bool)

Is the condition a single value or a range?
   true: single value (use 'high value' for the value)
   false: range (use 'low value' and 'high value')

4. next condition value (condlk) (blk_type)

The block table marker of the next condition value against which to test the referenced object.

R. BASE TYPE at_index

An INDEX data item in COBOL. This is implemented identically to an integer, but is a separate data type in order to check against COBOL semantics. There are no further attributes.

S. BASE TYPE at_blck

Entry made for a block (an inter scope). In most languages, this corresponds to a new frame. However, in 'C' and in MODULA-2 items in the block should be allocated at the same level as the current scope, as the block has only a significance with regard to visibility.

1. sub-block-index (sblk) (unt16)

The block index for the corresponding block in the symbol table which this entry refers to.

2. lexical level (bklev) (unt8)

The static nesting level of this block. Used to maintain the display.

T. BASE TYPE at_proc

Indicates a procedure type. Such an entry has a "parameter list" field which leads to its formal parameters. It also has a "return type" field.

Like a block entry, it has "sub-block-index" and "lexical level" fields. Notice a procedure, unlike a block in 'C' or MODULA-2 always creates a new frame.

1. parameter list (pmlst) (blk_type)

Block table marker for first formal parameter of the procedure. Value is zero if procedure has no parameters.

2. return type (rtty) (blk_type)

Block table marker for return type of procedure. Value is zero if procedure does not return anything.

3. sub-block-index (sblk) (unt16)

Block number for block corresponding to this procedure in the symbol table.

4. lexical level (bklev) (unt8)

Static nesting level of the procedure.

5. number of parameters (nprm) (unt8)

The number of parameters to the procedure 6. routine number (rout) (unt8)

For built-in procedures in certain languages only. This is an index into a pre-defined array of routines which handle special built-in functions of the language.

U. BASE TYPE at_parm

Objects having this type are parameters. This entry is used to chain the parameters of a procedure together.

1. parameter mode (pmode) (unt8)

Indicates direction of information flow between formal parameter and corresponding actual parameter. Values are:
   a. at_in: input parameter (may not be altered)
   b. at_out: output parameter (undefined on entry)
   c. at_inout: input-output parameter 2. parameter call (pcall) (unt8)

Indicates method of parameter passing. Values are:
   at_val: call by value
   at_ref: call by address 3. parameter object (poptr) (blk_type)

Block table marker of the object which is the formal parameter.

4. parameter type (ptptr) (blk_type)

Block table marker for the type of the formal parameter.

5. parameter link (pmlk) (blk_type)

Block table marker for the next entry (of base type "at_parm") for the next parameter of the procedure.

6. is conformant parm (conf) (bool)

Is this a conformant array parameter? Used only in ISO PASCAL. Values are:
   true: it is
   false: it isn't V. BASE TYPE at_undf This entry indicates the corresponding object is undefined. Items in error are generally given this type to avoid generating extra error messages. There are no other attributes.

W. BASE TYPE at_pkg

Indicates a package (ADA).

X. BASE TYPE at_def

Indicates a defined type (ADA).

1. defined type (dfty) (blk_type)

Block table marker for the type which this entry is defining.

Y. BASE TYPE at_log

A logical (or boolean) type. Should always be allocated like a medium-size integer. Has no further attributes.

Z. BASE TYPE at_sbrng

A subrange type. Has a "subrange type" field, indicating what type it is a subrange of. Also has "lower bound" and "upper bound" fields, pointing to objects giving the range.

1. subrange of (sbtp) (blk_type)

Block table marker for type of which this type is a subrange.

2. lower bound (lbd) (blk_type)

Block table marker for object giving lower bound of range.

3. upper bound (ubd) (blk_type)

Block table marker for object giving upper bound of range.

AA. BASE TYPE at_bit

The corresponding object is a bit field. The fields include a "bit width" field for the size (in bits) to allocate, a "working width" field for the item's current length, and an "is aligned" field for PL/I aligned bit fields.

1. bit width (btwidth) (unt16)

The number of bits to allocate for this item. May be zero for parameters and based items (in PL/I) or for zero-length bit fields (in 'C').

2. working width (wkwidth) (blk_type)

Block table marker for item which holds the run-time width of the field (passed to run-time routines).

3. is aligned (bitalgn) (bool)

Is the field to be aligned on a byte boundary? Values are:

true: yes
   false: no 4. bit offset (btofset) (unt8)

The length in bits from the start of the byte in which this bit field starts.

AB. BASE TYPE at_lbl

Label type. The only attribute gives the nesting level of the label.

1. nesting level (bklev) (unt8)

The static nesting level of block in which this label is defined (to handle jumps out of current scope).

AC. BASE TYPE at_ieee, at_sieee, at_lieee

Medium short, and long size real numbers represented internally in IEEE notation. Standard sizes only, so no further attributes.

AD. BASE TYPE at_file

Indicates an object of this type is a file. In PASCAL, we will store the file descriptor here, so an integer will be allocated. In COBOL, an entry for the file table will be allocated for each file.

1. file type (fltp) (blk_type)

Block table marker for type entry which indicates file consists of sequence of components of this type (PASCAL).

2. file buffer (fbuff) (blk_type) Block table marker for object which is the file's buffer area.

3. Linage counter (lcount) (blk_type)

Block table marker for the object which will serve as the LINAGE-COUNTER for the file (COBOL).

4. is a sort file? (issort) (bool)

Is this a sort file? (COBOL). Values:
   true: yes
   false: no

5. File organization (org) (unt8)
   a. at_seq: sequential
   b. at_rel: relative (random)
   c at_inx: indexed sequential 6. key list of file (fkylst) (blk_type)

Block table marker for the first (relative or indexed) key for the file.

AE. TYPE at_table

A COBOL table. Similar to an array, but in addition can vary in size (maximum limit given by some data item) and may be sorted according to certain keys. It also may contain a list of its own indexes.

1. element type (elty) (blk_type)

Like base type "at_arr", the element type of the table.

2. index list (inlst) (blk_type)

Also like "at_arr", block table marker for an "at_ardx" entry which will give array bounds. If the table is variable-size, the upper array bound is the (constant) maximum value.

3. variable bound (varbnd) (blk_type)

Block table marker for object which will give dynamic upper bound to size of table. If zero, table is fixed in size.

4. key list (kylst) (blk_type)

Block table marker for a key type entry (base type "at_key") which is the first (primary) key by which the table is sorted.

5. index (COBOL) list (ixlst) (blk —type)

Block table marker for an index chain entry (base type "at ixchn") which will lead to the first index associated with the table. Is zero if no indices are associated with the table.

6. The number of elements (nelt) (unt16)

The number of elements in the array (see under base type "at_arr").

BASE TYPE at_key

COBOL only. Used to chain together keys of table.

1. key pointer (kyptr) (blk_type)

Block table marker of object (which is member of the table) which serves as the key.

2. key mode (kymode) (at_type)

Whether the key is ascending or descending. Values are:
   a. at_asckey: ascending key
   b. at_deskey: descending key 3. key link (kylk) (blk_type)

Block table marker for next key in list.

AG. BASE TYPE at_ixchn

COBOL only. Used to chain together indexes of table.

1. index object (ixobj) (blk_type)

Block table marker for the object which is the corresponding index.

2. index link (ixlk) (blk_type)

Block table marker for the member of the index chain.

AH. BASE TYPE at_set

A set type. Currently, allocate objects which are sets as integers. For now, we will not allow sets to contain more member than there are bits in a medium-size word.

1. set type (setp) (blk_type)

Block table marker for the type which this entry is a set of.

AI. BASE TYPE at_char, at_uchar

Character or unsigned character type. There are no attributes.

AJ. BASE TYPE at_flt, at_sflt, at_lflt

AK. BASE TYPE at_ieee, at_sieee, at_lieee

Medium-size, short, and long floating-point types. 'flt' means hardware floating-point representation; 'ieee' refers to IEEE representation. Attributes are:

lower bound (lbd) (blk_type)
    upper bound (ubd) (blk_type)

These attributes exist due to the misguided belief that there were such things as subranges of floating-point types.

AL. BASE TYPE at_cmblk

A COMMON block (FORTRAN). Identifies the object whose type this is as a common block. Has the following attributes:

1. common-block list (cmlst) (blk_type)

Block table marker for the first item in a linked list for the same common block, but belonging to a different procedure.

AM. BASE TYPE at_cmitem

An item in a common block linked list. This type is used to chain the members together.

1. Common-block object (cmobj) (blk_type)

Block table marker for the object in the list 2. common-block link (cmlk) (blk_type)

Block table marker for the next item in the linked list.

AN. BASE TYPE at_pntr

A pointer type. Attribute is "target type".

1. target type (trty) (blk_type)

Block table marker of the type the pointer points to.

AO. BASE TYPE at_ucsdstring

The associated object is a STRING in UCSD PASCAL. Its length is the only attribute.

1. length of string (leng) (unt16)

The string's maximum length. The logical length of the string may vary dynamically, so the allocator must also allocate an integer in front of the string which will hold the current length.

AP. BASE TYPE at_arglist

An argument list (at present COBOL only). This is a collection of parameters, a pointer to which will be passed to a run-time procedure. It is always initialized via q-code, and its length is always calculated from the intialization values themselves. There are no attributes.

II. ACTUAL LAYOUT OF ATTRIBUTES IN BLOCK TABLE ENTRIES

We now describe where each attribute is stored in the entry in the symbol table. This information is not needed by a user of the symbol table module. It is internal to the system and maintained by the macros in the file "s3mac.h", which must be consistent with this layout.

A. All Entries:
byte 0
    bits 0-3: size of the entry in bytes/2 bits 4-7: for objects: the storage class (stcl)
        for integral types: Is constrained (cnstr)
        for parameter types: the parameter mode (pmode)
byte 1
    bits 0-1: the visibility (vis)
    bit 2: for procedure objects only: is referenced (refd)
    bits 3-4: alignment (algn)
    bit 5: for types: is examined (exam)
    bit 6: for objects: is constant (const)
    bit 7: nature (ntr)
bytes 2-3: has table marker of entry (htm)
bytes 4-7: for objects:
    for procedure and block types: size of the frame (osize)
bytes 8-9: back-chain marker (bkchn)

B. For Objects Only:
bytes 10-11: type reference (tref)
bytes 12-15: initialization value:
    integer value (invl) 12-15
    unsigned int value (unvl) 12-15
    character value (chvl) 12
    q-code pointer (qdpt) 12-15
    name table marker (nmpt) 12-13
    float value (ftvl) 12-13
    string value (stvl) 12-13
    label value (lbvl) 12-15
    bcd value (bcd) 12-13
    if initialization is for complex:
        real part (cxl) 12-13
        imaginary part (cx2) 14-15
    if initialization is for pointer:
        pointer object (ptvl) 12-13
        pointer offset (ptofs) 14-15
    if storage class is 'eqv' (equivalence), this will instead hold:
        equivalence link (eqlk) 12-13
        equivalence offset (eqoff) 14-15
    if storage class if 'fbuff' (file buffer), this will instead hold:
        file to which is buffer (tobuff) 12-13
        next file buffer (nxtbuf) 14-15
bytes 16-19: address (for static objects) or offset (for parameters, temporaries, or automatics) (addr)
byte 20: trap flag (for source debugger), register allocation flag (code generator), or local modes (source debugger—for procedure objects)
byte 21: bits 0-3: size of entry in bytes/2
    bits 4-7: kind of initialization (kdin)

C. For Types Only
Byte 10: base type (bsty)
D. Depending on the base type, the size of type entries vary. The last byte of every entry is the size of the entry itself, given in bytes/2.

1. BASE TYPE at_char
2. BASE TYPE at_uchar
3. BASE TYPE at_pkg
4. BASE TYPE at_undf
5. BASE TYPE at_string
6. BASE TYPE at_log
7. BASE TYPE at_cmplx
    byte 11: size of entry
10. BASE TYPE at_int
11. BASE TYPE at_sint
12. BASE TYPE at_lint
13. BASE TYPE at_flt
14. BASE TYPE at_sflt
15. BASE TYPE at_lflt
16. BASE TYPE at_unsg 17. BASE TYPE at_sunsg
18. BASE TYPE at_lunsg
19. BASE TYPE at_sieee
20. BASE TYPE at_ieee
21. BASE TYPE at)lieee
   bytes 11-12: lower bound (lbd)
   Bytes 13-14: upper bound (ubd)
   byte 15: size of entry
22. BASE TYPE at_pntr
   bytes 11-12: target type (trty)
   byte 13: size of entry
23. BASE TYPE at_arr
   bytes 11-12: element type (elty)
   bytes 13-14 index list (inlst)
   byte 15: number of dimensions (ndim)
   byte 16: row or column major (row)
   bytes 17-18: number of elements (nelt)
   byte 19: size of entry
24. BASE TYPE at_strct:
   bytes 11-12: field list (fdlst)
   byte 13: number of fields (nfld)
   bytes 14-15: record block number (rblk)
   byte 16: this byte intentionally left blank
   byte 17: size of entry
25. BASE TYPE at—union:
   bytes 11-12: member list (mblst)
   byte 13: number of member (nmem)
   byte 14: this byte intentionally left blank
   byte 15: size of entry
26. BASE TYPE at_bcd:
   bytes 11-12: number of decimal places (dcpt)
   bytes 13-14: number of digits (dgt)
   byte 15: size of entry
27. BASE TYPE at_blck:
   byte 11: nesting level (bklev)
   bytes 12-13: sub-block index (sblk)
   byte 14: this byte intentionally left blank
   byte 15: size of entry
28. BASE TYPE at_lbl;
   byte 11: nesting level (bklev)
   byte 12: this byte intentionally left blank
   byte 13: size of entry
29. BASE TYPE at_proc:
   byte 11: nesting level (bklev) or routine number (rout-)—FORTRAN
   bytes 12-13: sub-block index (sblk) (used in PASCAL as routine number but called also 'sblk')
   byte 14: number of parameters (nprm)
   bytes 15-16: return type (rtty)
   bytes 17-18: parameter list (pmlst)
   byte 19: size of entry
30. BASE TYPE at_def:
   bytes 11-12: defines type (dfty)
   byte 13: size of entry
31. BASE TYPE at_ardx:
   bytes 11-12: index pointer (inptr)
   bytes 13-14: index link (inlk)
   byte 15: size of entry
32. BASE TYPE at_stfd:
   bytes 11-12: type of field (fdptr)
   bytes 13-14: field link (fdlk)
   bytes 15-16: name of field (fdnm)
   bytes 17-18: parent of field (fdparent)
   bytes 19-22: displacement of field (disp)
   byte 23: size of entry
33. BASE TYPE at_unmb:
   bytes 11-12: type of member (mbptr)
   bytes 13-14: member link (mblk)
   bytes 15-16: name of member (mbnm)
   bytes 17-18: parent of member (mbparent)
   bytes 19-22: unused (must have same size as 'stfd' type entry, since we may mutate a structure field into a union member)
   byte 23: size of entry
34. BASE TYPE at_parm:
   bytes 11-12: parameter object (poptr)
   bytes 13-14: parameter link (pmlk)
   bytes 15-16: parameter type (ptptr)
   byte 17: is conformant parm (conf)
   byte 18: this byte intentionally left blank
   byte 19: size of entry
35. BASE TYPE at_darr:
   bytes 11-12: element type (elty)
   bytes 13-14: index list (inlst)
   byte 15: number of dimensions (ndim)
   byte 16: row or column major (row)
   byte 17: size of entry
36. BASE TYPE at_set:
   bytes 11-12: set type (sttp)
   byte 13: size of entry
37. BASE TYPE at_file:
   byte 11-12: file type (fltp) or linage counter (lcount-)—COBOL
   bytes 13-14: file buffer (fbuff)
   byte 15: is a sort file? (issort)
   byte 16: file organization (org)
   bytes 17-18: key list of file (fkylst)
   byte 19: size of entry
38. BASE TYPE at_sbrng:
   bytes 11-12: lower bound (lbd)
   bytes 13-14: upper bound (ubd)
   bytes 15-16: subrange type (sbtp)
   byte 17: size of entry
39. BASE TYPE at_numeric:
   bytes 11-12; length (leng)
   byte 13: number of decimal places (dp)
   byte 14: sign information (sign)
   byte 15: is computatonal? (comp)
   byte 16: unused
   byte 17: size of entry
40. BASE TYPE at_numed:
   bytes 11-12: length (leng)
   byte 13: number of decimal places (dp)
   byte 14: blank when zero (bwz)
   bytes 15-16: picture (pic)
   byte 17: size of entry
41. BASE TYPE at_alfa:
   bytes 11-12: length (leng)
   byte 13: this byte intentionally left blank
   byte 14: is justified (just)
   bytes 15-16: picture (pic)
   byte 17: size of entry
42. BASE TYPE at_alfnum:
   bytes 11-12: length (leng)
   byte 13: this byte intentionally left blank
   byte 14: is justified (just)
   byte 15: size of entry
43. BASE TYPE at_alfed:
   bytes 11-12: length (leng)
   byte 13: this byte intentionally left blank
   byte 14: is justified (just)
   bytes 15-16: picture (pic)
   byte 17: size of entry
44. BASE TYPE at_enum:
   bytes 11-12: enumeration list (enlst)
   byte 13: size of entry 45. BASE TYPE at_enmb:
   bytes 11-12: enumeration object (enobj)
   bytes 13-14: enumeration link (enlk)
   byte 15: size of entry
46. BASE TYPE at_bit:
   bytes 11-12: bit width (btwidth)
   bytes 13-14: working width (wkwidth)
   byte 15: is aligned (btalgn)
   byte 16: bit offset (btofset)
   byte 17: size of entry
47. BASE TYPE at_fstring:
   bytes 11-12: allocated length (alleng)
   bytes 13-14: working length (wkleng)
   byte 15: is string varying in length? (vary)
   byte 16: this byte intentionally left blank
   byte 17: size of entry
48. BASE TYPE at_cmblk:
   bytes 11-12: head of common-block list (cmlst)
   bytes 13-14: next common-block list (cmnxt)
   byte 15: size of entry
49. BASE TYPE at_cmitem:
   bytes 11-12: common object (cmobj)
   bytes 13-14: link to next item in chain (cmlk) byte 15:
   size of entry
50. BASE TYPE at_table:
   bytes 11-12: element type (elty)
   bytes 13-14: index list (inlst)
   bytes 15-16: size of table (varbnd)
   bytes 17-18: number of elements (nelt)
   bytes 19-20: index (COBOL) list (ixlst)
   bytes 21-22: key list (kylst)
   byte 23: size of entry
51. BASE TYPE at_ixchn:
   bytes 11-12: index object (ixobj)
   bytes 13-14: link to next index (ixlk)
   byte 15: size of entry
52. BASE TYPE at_key:
   bytes 11-12: key object (kyptr)
   bytes 13-14: link to next key (kylk)
   byte 15: ascending or descending (kymode)
   byte 16: this byte intentionally left blank
   byte 17: size of entry
53. BASE TYPE at_para:
   byte 11: is a section? (issect)
   byte 12: this byte intentionally left blank
   bytes 13-14: parent section (sect)
   byte 15: referenced out of section? (extref)
   byte 16: number of times defined (dfcount)
   bytes 17-18: saved next paragraph (save)
   bytes 19-20: next paragraph (next)
   byte 21: size of entry
54. BASE TYPE at_cond:
   bytes 11-12: referenced object (cndobj)
   bytes 13-14: value list (cndlst)
   byte 15: size of entry
55. BASE TYPE at_cndvl:
   bytes 11-12: low value (locnd)
   bytes 13-14: high (or only) value (hicnd)
   byte 15: only one value? (sngl)
   byte 16: this byte intentionally left blank
   bytes 17-18: next condition value (condlk)
   byte 19: size of entry
56. BASE TYPE at_index:
   byte 11: size of entry
57. BASE TYPE at_vcsd string:
   bytes 11-12: length of string (leng)
   byte 13: size of entry
58. BASE TYPE at_arglist:
   byte 11: size of entry

APPENDIX 3

I. Phi-code TM Operators

The Phi-code TM is produced by the flattener from the AST file. This is done by a preorder walk through the tree (a postorder walk in the case of expressions). The operators of the Phi-code TM are often identical to nodes in the AST tree, however, this is not a one-to-one mapping. The flattener needs to add temporary variables to the symbol table to carry intermediate results which are implicit in the tree. It also needs to perform transformations on the tree which produce additional quads. One important transformation is to convert high-level control statements into simple tests and jumps.

In the list of quads in Appendix 3, the words OPERAND and RESULT indicate fields which are operands. LITERAL indicates those fields which are literal integers. NAME indicates those fields which are pointers into the names table. When necessary for clarity, these names will be suffixed by an integer ordinal.

As a general rule, quads are homogeneous. That is, their operands have the same type and size. For example, the q_plus quad can add two ints or two floats, but not an int and a float.

The list in Appendix 3 gives a general description of the quad operators. The specific types which an operator can take are given in the table which follows.

A. General pseudo-instructions.

1. q_alpha—This is the first quad generated by the flattener for each compilation unit (each compiled file). It is never executed. It appears for purposes of initialization in later passes.

2. q_omega—This is the last quad in any Phi-code TM file. It is never executed. It is used for ease of termination in later passes.

3. q_file NAME LITERAL—NAME is the source file where an "#include" or a reference to a separately compiled file occurred. The code-generator emits non-executable "code" (i.e., we emit a jump around the "code") as follows:
   a special q_file linemark
   LITERAL as an integer
   NAME as an ASCII string 4. q_label OPERAND—A psuedo operation marking the position of a statement label contained in OPERAND.

5. q_clabel OPERAND—a pseudo operation marking the position of a compiler generated label contained in OPERAND.

6. q_corpus OPERAND—
This pseudo-instruction marks the start of a subprogram. OPERAND is a pointer to the block table entry for the subprogram. Also, saves registers (in a static location for Basics) if necessary. Pops parameters into static locations (Basics only). Copies register statics onto stack (Basics). Allocates space on stack for local, automatic objects.

7. q_endcorpus—
Marks the end of a subprogram. This quad is never 'executed'.

8. q_benter OPERAND—Causes a new scope to be entered. OPERAND is a pointer to the block table entry for the block.

9. q_bexit—Causes the current scope to be exited.

B. Calling Sequence
   1. q_fparam OPERAND 2. q—f2param OPERAND1 OPERAND2

3. q—f3param OPERAND1 OPERAND2 OPERAND3

Mark the start of the calling sequence. [Note that expressions to compute parameter values, which may include function calls, can be nested within a calling sequence (e.g., sqrt(abs(a))).] pushes OPERAND(s) onto the stack as the first actual parameter(s) in the current calling sequence. OPERANDs are pushed in the order they appear in the quad. OPERAND(s) must be of scalar type. (Languages that allow passing composite types by value will make a copy of objects and pass a pointer to them as the OPERAND.)

4. q—faparam OPERAND 5. q—f2aparam OPERAND1 OPERAND2

6. q—f3aparam OPERAND1 OPERAND2 OPERAND3.

Mark the start of the calling sequence. Push the address(es) of OPERAND(s) onto the stack as the first actual parameters(s) in the current calling sequence. The addresses are pushed in the order that their respective OPERANDS appear in the quad.

7. q—param OPERAND 8. q—2param OPERAND1 OPERAND2

9. q—3param OPERAND1 OPERAND2 OPERAND3

Push OPERAND(s) onto the stack as the next actual parameter(s) in the current calling sequence. OPERAND(s) are pushed in the order they appear in the quad. OPERAND(s) must be of a scalar type. (Languages that allow passing composite types by value will make a copy of these objects and pass a pointer to them as the OPERAND.)

10. q—aparam OPERAND 11. q—2aparam OPERAND1 OPERAND2

12. q—3aparam OPERAND1 OPERAND2 OPERAND3

Push the address(es) of OPERAND(s) onto the stack as the next actual parameter(s) in the current calling sequence. The addresses are pushed in the order that their respective OPERAND(s) appear in the quad.

13. q—pcall OPERAND—Procedure call. OPERAND is a procedure object. Computes the static link if necessary and transfers control to that procedure, saving the return address in the proper slot on the stack. Cleans up the stack after the call. Any return value is ignored (as none is expected).

14. q—npcall OPERAND—Parameterless procedure call. OPERAND is a procedure object. Computes the static link if necessary and transfers control to that procedure, saving the return address in the proper slot on the stack. Cleans up the stack after the call. Note that this is the first quad in its calling sequence. No q—f.-.param's will appear.

15. q—ppcall OPERAND1 OPERAND2
   OPERAND2—param
   OPERAND1—proc

· Procedure call with only one parameter, passed by reference. OPERAND1 is a procedure object. OPERAND2 is a scalar parameter. Pushes OPERAND2 on the stack as the only parameter in the current sequence. Computes the static link if necessary and transfers control to that procedure, saving the return address in the proper slot on the stack. Cleans up the stack after the call.

16. q—apcall OPERAND1 OPERAND2
   OPERAND1—proc
   OPERAND2—aparam

Procedure call with only one parameter, passed by reference. OPERAND1 is a procedure object. OPERAND2 is a scalar parameter. Pushes address of OPERAND2 on the stack as the only parameter in the current calling sequence. Computes the static link if necessary and transfers control to that procedure, saving the return address in the proper slot on the stack. Cleans up the stack after the call.

17. q—fcall OPERAND1 OPERAND2
   OPERAND1—func
   OPERAND2—return

Function call. OPERAND1 is a procedure object. OPERAND2 is where the return value is to go. Computes the static link if necessary and transfers control to that procedure, saving the return address in the proper slot on the stack. Retrieves the return value and puts it in OPERAND2. The stack is then cleaned up.

18. q—nfcall OPERAND1 OPERAND2
   OPERAND1—func
   OPERAND2—return

Parameterless function call. OPERAND1 is a procedure object. OPERAND2 is where the return value is to go. Computes the static link if necessary and transfers control to that procedure, saving the return address in the proper slot on the stack. Retrieves the return value and puts it in OPERAND2. The stack is then cleaned up.

Note that this is the first quad in its calling sequence. No q—f . . . param's will appear.

19. q—pfcall OPERAND1 OPERAND2 OPERAND3
   OPERAND1—func
   OPERAND2—return
   OPERAND3—param Function call with only one parameter, passed by value. OPERAND1 is a procedure object. OPERAND2 is where the return value is to go. OPERAND3 is a scalar parameter. Pushes OPERAND3 on the stack as the only parameter in the current calling sequence. Computes the static link if necessary and transfers control to that procedure, saving the return address in the proper slot on the stack. Retrieves the return value and puts it in OPERAND2. The stack is then cleaned up.

20. q—afcall OPERAND1 OPERAND2 OPERAND3
   OPERAND1—func
   OPERAND2—return
   OPERAND3—aparam Function call with only one parameter, passed by reference. OPERAND1 is a procedure object. OPERAND2 is where the return value is to go. OPERAND3 is a scalar parameter. Pushes address of OPERAND3 on the stack as the only parameter in the current calling sequence. Computes the static link if necessary and transfers control to that procedure, saving the return address in the proper slot on the stack. Retrieves the return value and puts it in OPERAND2. The stack is then cleaned up.

21. q—gosub LABEL—This performs the BASIC gosub instruction. Since the operation of returning from a function and return from a gosub are indistinguishable and must do the same thing, this instruction must set up the stack as it would be set up when calling a function. Thus, the q—gosub must push the return address and set up the frame pointer before jumping to the given label. This quad appears alone. It has no params of any sort to accompany it.

22. q_unparam LITERAL RESULT—Stores the value of out or inout value parameter in RESULT. LITERAL gives the (zero-based) index of the parameter. This quad must follow a q_ncall, q_fcall, or one of their related quads.

C. Procedure Body and Return 1. q_nbprms RESULT—Sets result to the integer number of parameters actually passed to this call of the procedure. (Used for procedures which may have a variable number of parameters.)

2. q_rset OPERAND—Sets the return value to the value of OPERAND. If the size of the value exceeds the space allocated on the stack for the return value, a pointer to the value is stored (the return value slot must be large enough to store a pointer).

3. q_return—Restores registers if necessary, then returns control to the calling procedure. At least one q_return must be present in each procedure body. A q_return must preceed a q_endcorpus if the quad preceeding it would otherwise be anything but a jump.

D. Unconditional Jumps 1. q_jmpb OPERAND—Jump to the label in OPERAND. This is the only jump (or test and jump) which may transfer control out of the current block of procedure, or jump to a label variable. The block or procedure to which control is transferred must statically enclose the current scope.

2. q_jmp OPERAND—Jumps to the label constant in OPERAND.

E. Conditional Jumps.

1. q_jeq OPERAND1 OPERAND2 OPERAND3—Jumps to label in OPERAND3 if OPERAND1=OPERAND2.

2. q_jne OPERAND1 OPERAND2 OPERAND3—Jumps to label in OPERAND3 if OPERAND1 is not equal to OPERAND2.

3. q_jlt OPERAND1 OPERAND2 OPERAND3—Jumps to label in OPERAND3 if OPERAND1 is less than OPERAND2.

4. q_jle OPERAND1 OPERAND2 OPERAND3—Jumps to label in OPERAND3 if OPERAND1 is less than or equal to OPERAND2.

5. q_jgt OPERAND1 OPERAND2 OPERAND3—Jumps to label in OPERAND3 if OPERAND1 is greater than OPERAND2.

6. q_jge OPERAND1 OPERAND2 OPERAND3—Jumps to label in OPERAND3 if OPERAND1 is greater than or equal to OPERAND2.

The type of OPERAND1 in the following jumps must be normal integer. True is any non-zero value, false is zero.

7. q_jt OPERAND1 OPERAND2—Jumps to label in OPERAND2 if OPERAND1 is true.

8. q_jf OPERAND1 OPERAND2—Jumps to label in OPERAND2 if OPERAND1 is false.

F. Multiple Target Conditionals 1. q_indxjp OPERAND LITERAL
   q_ltab OPERAND1
   .
   .
   .
   q_ltab OPERANDn
2. q_endindxjp An indexed jump sequence. OPERAND1 thru n are n label objects. LITERAL must equal n. Control is transferred to OPERAND i if the value of OPERAND is i. Separate tests must insure that OPERAND has a value between 1 and n. If OPERAND is allowed to assume a value outside this range the indexed jump will produce arbitrary results.

3. q_indxgosub OPERAND LITERAL
   q_ltab OPERAND1
   .
   .
   .
   q_ltab OPERANDn
4. q_endindxjp An indexed gosub sequence. This is very much like q indxjp (see above). OPERAND1 thru n are n label objects. LITERAL must equal n. Control is then transferred to OPERAND i if the value of OPERAND is i. Control is transferred in the same way it would be via a q gosub. Separate tests must insure that OPERAND has a value between 1 and n. If OPERAND is allowed to assume a value outside this range the indexed gosub will produce arbitrary results.

5. q_lkupjp OPERAND LITERAL
   q_lktab OPERAND1 LABEL1
   .
   .
   .
   q_lkkab OPERANDn LABELn
6. q_endlkupjp LABELm A lookup jump sequence. OPERAND1 thru n are n constant objects. LABEL1 thru n are n label objects. Literal must equal n. Control is transferred to LABELi if the value of OPERANDi is equal to the value of OPERAND. If two or more of these values are equal, and equal to the value of OPERAND, control will be transferred to an arbitrary member of the set of corresponding labels. If none of the values in OPERAND1 thru OPERANDn are equal to OPERAND, then control is transferred to OPERANDm, which acts as a default.

G. Computation

1. Arithmetic Computation a. q_uminus OPERAND RESULT—RESULT:=−OPERAND b. q_plus OPERAND1 OPERAND2 RESULT—RESULT:=OPERAND1+OPERAND2 c. q_minus OPERAND1 OPERAND2 RESULT—RESULT:=OPERAND1−OPERAND2 d. q_mult OPERAND1 OPERAND2 RESULT—RESULT:=OPERAND1 * OPERAND 2 e. q_div OPERAND1 OPERAND2 RESULT—RESULT:=OPERAND1 /OPERAND2 f. q_expon OPERAND1 OPERAND2 RESULT—RESULT:=OPERAND1 ** OPERAND2 g. q_rem OPERAND1 OPERAND2 RESULT—RESULT:=OPERAND1 rem OPERAND2. When they are both positive, OPERAND1=(OPERAND1/OPERAND2) * OPERAND2+(OPERAND1 rem OPERAND2) and, for non-positive values, the following two relations (which must hold for all values of the operands) may be used to define the value of rem:

$$A \text{ rem } (-B) = A \text{ rem } B$$

$$(-A) \text{ rem } B = -(A \text{ rem } B)$$

This implies that the remainder has the same sign as the dividend.

h. q_incr RESULT LITERAL—RESULT:=RESULT+LITERAL Note that RESULT is both a source and a destination. (If RESULT is a stack operand, it is both a minus and a plus.)

2. Boolean Computation

The following Phi-code ™ s perform boolean operations on integer operands, taking 0 as false and non-zero as true. They return an integer result.

a. q_not OPERAND RESULT—RESULT:=not OPERAND b. q_and OPERAND1 OPERAND2 RESULT—RESULT:=OPERAND1 and OPERAND2 c. q_or OPERAND1 OPERAND2 RESULT—RESULT:=OPERAND1 or OPERAND2 d. q_xor OPERAND1 OPERAND2 RESULT—RESULT:=OPERAND1 xor OPERAND2

3. Boolean Comparison

These operators compare their first two operands and set the integer result to a true or false value.

a. q_eq OPERAND1 OPERAND2 RESULT—RESULT:=(OPERAND1 =OPERAND2)

b. q_ne OPERAND1 OPERAND2 RESULT—RESULT:=not (OPERAND1=OPERAND2)

c. q_lt OPERAND1 OPERAND2 RESULT—RESULT:=(OPERAND<=OPERAND2)

d. q_le OPERAND1 OPERAND2 RESULT—RESULT:=(OPERAND1> =OPERAND2)

e. q_gt OPERAND1 OPERAND2 RESULT—RESULT:=(OPERAND1>OPERAND2)

f. q_ge OPERAND1 OPERAND2 RESULT—RESULT:=(OPERAND1> =OPERAND2)

4. Bitwise Computation a. q_band OPERAND1 ORERAND2 RESULT—RESULT is bitwise and of OPERAND1 and OPERAND2.

b. q_bor OPERAND1 OPERAND2 RESULT—RESULT is bitwise or of OPERAND1 and OPERAND2.

c. q_bxor OPERAND1 OPERAND2 RESULT—RESULT is bitwise exclusive or of OPERAND1 OPERAND2

5. The following operators take characters and any size integers or unsigned, and produce results of the same type.

a. q_lshift OPERAND1 OPERAND2 RESULT—The RESULT is OPERAND1 shifted left OPERAND2 bits. The vacated bits are zero filled. The RESULT is undefined when OPERAND2 is negative, or greater than or equal to the number of bits in an integer.

b. q_rshift OPERAND1 OPERAND2 RESULT—If OPERAND1 is unsigned, then the RESULT is that value shifted right with zero fill OPERAND2 places. If OPERAND1 is an integer, then the RESULT may be zero filled or filled with the sign bit as the implementation chooses. The result is undefined if OPERAND2 is negative or greater than or equal to the length of an integer in bits.

c. q_lrot OPERAND1 OPERAND2 RESULT—The RESULT is OPERAND1 rotated OPERAND2 bits. The RESULT is undefined when OPERAND2 is negative, or greater than or equal to the number of bits in an integer.

d. q_rrot OPERAND1 OPERAND2 RESULT—The RESULT is OPERAND1 rotated right OPERAND2 bits. The result is undefined when OPERAND1 is negative, or greater than or equal to the number of bits in an integer.

e. q_blcomp OPERAND RESULT—RESULT is the one's complement of OPERAND

6. Miscellaneous Computation a. q_rnge RESULT—If RESULT is an numerical range of its type, leaves result unchanged. Otherwise, transfers control to runtime exception routine.

b. q_addr OPERAND RESULT—RESULT is assigned the location of OPERAND. RESULT must be a pointer to the type of OPERAND.

c. q_size OPERAND RESULT—RESULT is assigned the size, in bytes, of OPERAND. OPERAND may also be a type name. RESULT may be an integer or unsigned.

H. Data Movement 1. q_mov OPERAND RESULT—RESULT:=OPERAND OPERAND and RESULT must be of the same type and size. (This is simple assignment.)

2. q_bmov OPERAND1 OPERAND2 RESULT—This is a block move. OPERAND2 gives the number of bytes to be moved from OPERAND1 to RESULT. OPERAND2 is greater than 0.

3. q_scale OPERAND1 OPERAND2 RESULT—This quad is used to scale an index for subsequent array access. OPERAND1 is an array; OPERAND2 is an index into the array, and RESULT is the scaled version of the index. The front end issues a q scale preceding every q_ldi, q_sti, and q_aref instruction. However, the data flow optimizer is free to remove these when performing strength reduction operations. Hence, the back end cannot expect these to always be present. Also, some target machines (iAPX-432, 16000) perform automatic index scaling when an array is accessed. For these machines, the q scale is equivalent to a q mov. In these cases, the optimizer must not do strength reduction of this nature. The optimizer has an option for this purpose.

4. q_ldi OPERAND1 OPERAND2 RESULT—Load indexed.

OPERAND1 is an array and OPERAND2 provides an index into the array. The meaning of the indirect bit for OPERAND1 is not what it usually indicates for operands. If the array is implemented by a (constant) pointer to the array (as in C), then the indirect bit is on indicating that the value of this pointer must be added to the value of OPERAND2. If there is no array pointer (FORTRAN), then the indirect bit is off. The base address specified by OPERAND1 is added to the value of OPERAND2 and RESULT is set to the value pointed to. Note that OPERAND2 has already been scaled to contain a byte offset.

5. q_sti OPERAND1 OPERAND2 OPERAND3—Store indexed. Stores value of OPERAND3 at (location of OPERAND1+OPERAND2). OPERAND2 must be of type integer.

6. q_aref OPERAND1 OPERAND2 RESULT—OPERAND1 is an array or pointer and OPERAND2 is a (scaled) index into the array or offset from the pointer. RESULT is a pointer into whose target type is the element type of OPERAND1 (if OPERAND1 is an array) or the target type of OPERAND1 (if it is a pointer). The address of OPERAND1 [OPERAND2] is stored in RESULT.

7. q_ldf OPERAND1 OPERAND2 RESULT—Load field. OPERAND1 is a structure object and OPERAND2 is a pointer to the symbol table entry for a structure field. The storage allocator assigns offsets for each structure field, and this offset is used in accessing the value. The value is transferred to RESULT.

8. q_stf OPERAND1 OPERAND2 OPERAND3—Store field. OPERAND3 is stored in the structure field specified by OPERAND1 and OPERAND2.

9. q—sref OPERAND1 OPERAND2 RESULT—OPERAND1 is a structure or a pointer to a structure. This quad operates on structures as q—aref operates on arrays.

I. Type Conversion

Conversion is only allowed between objects of the following types (of any length): integer, float, character, unsigned, bcd.

In addition, conversion is allowed between pointer and integer, and between enumeration and integer.

Explicit range checks must be inserted if the rules of the source language require that a converted value that would be out of range is to be detected. The convert operators will perform no range checks themselves, and may produce an arbitrary result if the converted value would be out of range.

The following convert operators will have the target type encoded in their names. The operator names are of the form q—ctxxxx, where xxxx is a code for the type being converted to.

1. q—ctchar OPERAND RESULT
2. q—ctuchar OPERAND RESULT
3. q—ctint OPERAND RESULT
4. q—ctsint OPERAND RESULT
5. q—ctlint OPERAND RESULT
6. q—ctunt OPERAND RESULT
7. q—ctsunt OPERAND RESULT
8. q—ctlunt OPERAND RESULT
9. q—ctflo OPERAND RESULT
10. q—ctsflo OPERAND RESULT
11. q—ctlflo OPERAND RESULT
12. q—ctieee OPERAND RESULT
13. q—ctsieee OPERAND RESULT
14. q—ctlieee OPERAND RESULT
15. q—ctbcd OPERAND RESULT
16. q—ctenum OPERAND RESULT
17. q—ctptr OPERAND RESULT J. Data Initialization Quade These quads are used for static initializations of data. They are never 'executed' by the interpreter and the code generator emits no code for them. They are used by the storage allocator to generate directives to the assembler to initialize static storage properly.

1. q—idata
2. q—iedata

Mark the start and end of a section of data init quads. No data initialization quad may appear outside of these markers and no non-data initialization quad may appear between them.

| 3. | q—iname  | NAME |      |      |
|----|----------|------|------|------|
| 4. | q—i2name | NAME | NAME |      |
| 5. | q—i3name | NAME | NAME | NAME |

Holds one, two, or three name table markers of items to be initialized.

II. Summary of Phi-code TM s and Operand Types

This section defines the possible types for each Phi-code TM. Most operands are pointers into symbol table entries which describe objects of various basic types. These types are:

char—Character
uchar—Unsigned character
int—integer
sint—short integer
lint—long integer
unt—unsigned integer
sunt—short unsigned integer
lunt—long unsigned integer
flo—floating point number
sflo—short floating point number
lflo—long floating point number
ieee—ieee floating point number
sieee—short ieee floating point number
lieee—long ieee floating point number
bcd—binary coded decimal number
enum—enumeration object
ptr—pointer to an object. In the following table, if a pointer to a specific type is to be specified, the notation ptr.type will be used.
arr—an array. An array containing a certain element type is denoted arr.type.
str—a structure. A field of a structure of a given type is str.type.
union—a union.
lab—label object
proc—procedure object In addition to a symbol table pointer, an operand can be one of the following:

lit—literal value—an integer quantity

The following table describes what operand types each Phi-code TM may take. The first column gives one or more Phi-code TM s being described. The remaining three columns give the allowable types for each operand. Each line gives one possible combination of operand types. For example, a q—add can take three ints or three floats; this is represented by two lines in the table. Alternatively, a—sti takes an array pointer as the first operand and several possible types as the second operand; this is represented as one line in the table.

If an operand can take indirection, an "*" 10 appears in the column. If the indirect flag is set for the operand in a particular Phi-code TM, the operand and will be a pointer to the allowable type. If a symbol table pointer operand MUST be a constant, a "C" appears in the column. If a symbol table pointer operand MUST be a variable, a "v" appears.

| A. General instructions and psuedo-ops | | | |
|---|---|---|---|
| 1. q—alpha | | | |
| 2. q—omega | | | |
| 3. q—label | | C lab | |
| 4. q—clabel | | C lab | |
| 5. q—corpus | | C proc | |
| 6. q—endcorpus | | | |
| B. Blocks | | | |
| 1. q—benter | bptr | | |
| 2. q—bexit | | | |
| C. Calling Sequence | | | |
| q—fparam | *char, uchar, uchar | char, uchar, | char, |
| q—f2param int,sint,lint | int,sint,lint, | int,sint,lint | |
| q—f3param unt,sunt,lunt | unt,sunt,lunt, | unt,sunt,lunt, | |
| q—faparam flo,sflo,lflo, | flo,sflo,lflo, | flo,sflo,lflo, | |
| q—f2aparam ieee,sieee,lieee | ieee,sieee,lieee, | ieee,sieee,lieee, | |
| q—f3aparam bcd,ptr,lab | bcd,ptr,lab | bcd,ptr,lab | |
| q—param | proc | proc | proc |
| q—2param | | | |
| q—3param | | | |
| q—aparam | | | |
| q—2aparam | | | |
| q—3aparam | | | |
| q—pcall | *proc (1) | | |
| q—npcall | | | |

-continued

| | | |
|---|---|---|
| q_ppcall | *proc (1) | *char,uchar,int, |
| q_nacall | | sint,lint,unt,sint, |
| | | lunt,flo,slfo,lflo, |
| | | ieee,sieee,lieee,bcd, |
| | | ptr,lab,proc |
| q_f call | *proc (1) | *V char,uchar |
| q_nfcall | | int,sint,lint |
| | | unt,sunt,lunt, |
| | | flo,sflo,lflo, |
| | | ieee,sieee,lieee, |
| | | bcd,ptr,lab,proc |
| q_pfcall | *proc (1) | *V char,unchar |
| *char,uchar | | |
| q_afcall | | int,sint,lint |
| int,sint,lint | | |
| | | unt,sunt,lunt |
| unt,sunt,lunt | | |
| | | flo,sflo,lflo |
| flo,sflo,lflo | | |
| | | ieee,sieee,lieee |
| ieee,sieee,lieee | | |
| | | bcd,ptr,lab |
| bcd,ptr,lab | | |
| | | proc proc |
| q_gosub | label | |
| q_unparam | lit | *V char,uchar, |
| | | int,sint,lint, |
| | | unt,sunt,lunt, |
| | | flo,sflo,lflo, |
| | | ieee,sieee,lieee, |
| | | bcd,ptr,lab, |
| | | proc |
| q_nbprms | int | |
| q_rset | | *char,uchar, |
| | | int,sint,lint, |
| | | unt,sunt,lunt, |
| | | flo,slfo,lflo, |
| | | ieee,sieee,lieee, |
| | | bcd,ptr,lab, |
| | | proc |
| q_return | | |

D. Unconditional Jumps

| | | |
|---|---|---|
| q_jmpb | * lab (1) | |
| q_jmp | C lab | |

E. Conditional Jumps

| | | | |
|---|---|---|---|
| q_jeq | * char | * char | C lab |
| q_jne | * uchar | * uchar | C lab |
| | * int | * int | C lab |
| | * sint | * sint | C lab |
| | * lint | * lint | C lab |
| | * unt | * unt | C lab |
| | * sunt | * sunt | C lab |
| | * lunt | * lunt | C lab |
| | * flo | * flo | C lab |
| | * sflo | * sflo | C lab |
| | * lflo | * lflo | C lab |
| | * ieee | * ieee | C lab |
| | * sieee | * sieee | C lab |
| | * lieee | * lieee | C lab |
| | * bcd | * bcd | C lab |
| | * enum | * enum | C lab |
| | * lab | * lab | C lab |
| | * proc | * proc | C lab |
| | * ptr | * ptr | C lab |
| q_jlt | * char | * char | C lab |
| q_jle | * uchar | * uchar | C lab |
| q_jgt | * int | * int | C lab |
| q_jge | * sint | * sint | C lab |
| | * lint | * lint | C lab |
| | * unt | * unt | C lab |
| | * sunt | * sunt | C lab |
| | * lunt | * lunt | C lab |
| | * flo | * flo | C lab |
| | * sflo | * sflo | C lab |
| | * lflo | * lflo | C lab |
| | * ieee | * ieee | C lab |
| | * sieee | * sieee | C lab |
| | * lieee | * lieee | C lab |
| | * bcd | * bcd | C lab |
| | * enum | * enum | C lab |
| q_jt | * int | C lab | |
| q_jf | | | |

F. Multi-target Conditionals

| | | |
|---|---|---|
| q_indxjp | * char,uchar | lit |
| | int,sint,lint, | |
| | unt,sunt,lunt, | |
| | enum | |
| q_indxgosub | * char,uchar, | lit |
| | int,sint,lint, | |
| | unt,sunt,lunt | |
| | enum | |
| q_ltab | C lab | |
| q_endindxjp | | |
| q_lkupjp | * char,uchar, | lit |
| | int,sint,lint, | |
| | unt,sunt,lunt, | |
| | enum | |
| q_lktab | C char,uchar, | C lab |
| | int,sint,lint, | |
| | unt,sunt,lunt, | |
| | enum | |
| q_endlkupjp | C lab | |

G. Computation

| | | | |
|---|---|---|---|
| q_uminus | * int | *V int | |
| | * sint | *V sint | |
| | * lint | *V lint | |
| | * flo | *V flo | |
| | * sflo | *V sflo | |
| | * lflo | *V lflo | |
| | * ieee | *V ieee | |
| | * sieee | *V sieee | |
| | * lieee | *V lieee | |
| | * bcd | *V bcd | |
| q_plus. | * int | * int | *V int |
| q_minus | * sint | * sint | *V sint |
| q_mult | * lint | * lint | *V lint |
| q_div | * unt | * unt | *V unt |
| q_expon | * sunt | * sunt | *V sunt |
| | * lunt | * lunt | *V lunt |
| | * flo | * flo | *V flo |
| | * sflo | * sflo | *V sflo |
| | * lflo | * lflo | *V lflo |
| | * ieee | * ieee | *V ieee |
| | * sieee | * sieee | *V sieee |
| | * lieee | * lieee | *V lieee |
| | * bcd | * bcd | *V bcd |
| q_rem | * int | * int | *V int |
| | * sint | * sint | *V sint |
| | * lint | * lint | *V lint |
| | * unt | * unt | *V unt |
| | * sunt | * sunt | *V sunt |
| | * lunt | * lunt | *V lunt |
| | * bcd | * bcd | *V bcd |
| q_incr | * char | lit | |
| | * uchar | lit | |
| | * int | lit | |
| | * sint | lit | |
| | * lint | lit | |
| | * unt | lit | |
| | * sunt | lit | |
| | * lunt | lit | |
| | * enum | lit | |
| | * ptr | lit | |
| | * bcd | lit | |
| q_not | * int | *V int | |
| q_and | * int | * int | *V int |
| q_or | | | |
| q_xor | | | |
| q_eq | * char | * char | *V int |
| q_ne | * uchar | * uchar | *V int |
| | * int | * int | *V int |
| | * sint | * sint | *V int |
| | * lint | * lint | *V int |
| | * unt | * unt | *V int |
| | * sunt | * sunt | *V int |
| | * lunt | * lunt | *V int |
| | * flo | * flo | *V int |
| | * sflo | * sflo | *V int |
| | * lflo | * lflo | *V int |
| | * ieee | * ieee | *V int |
| | * sieee | * sieee | *V int |
| | * lieee | * lieee | *V int |
| | * bcd | * bcd | *V int |
| | * enum | * enum | *V int |

-continued

| op | arg1 | arg2 | result |
|---|---|---|---|
| | * lab (1) | * lab | *V int |
| | * proc (1) | * proc | *V int |
| | * ptr | * ptr | *V int |
| q__lt | * char | * char | *V int |
| q__le | * uchar | * uchar | *V int |
| q__gt | * int | * int | *V int |
| q__ge | * sint | * sint | *V int |
| | * lint | * lint | *V int |
| | * unt | * unt | *V int |
| | * sunt | * sunt | *V int |
| | * lunt | * lunt | *V int |
| | * flo | * flo | *V int |
| | * sflo | * sflo | *V int |
| | * lflo | * lflo | *V int |
| | * ieee | * ieee | *V int |
| | * sieee | * sieee | *V int |
| | * lieeee | * lieee | *V int |
| | * bcd | * bcd | *V int |
| | * enum | * enum | *V int |
| q__band | * char | * char | *V char |
| q__bor | * uchar | * uchar | *V uchar |
| q__bxor | * int | * int | *V int |
| | * sint | * sint | *V sint |
| | * lint | * lint | *V lint |
| | * unt | * unt | *V unt |
| | * sunt | * sunt | *V sunt |
| | * lunt | * lunt | *V lunt |
| | * flo | * flo | *V flo |
| | * sflo | * sflo | *V sflo |
| | * lflo | * lflo | *V lflo |
| | * ieee | * ieee | *V flo |
| | * sieee | * sieee | *V sflo |
| | * lieee | * lieee | *V lflo |
| q__lshift | * char | * unt | *V char |
| q__rshift | * uchar | * unt | *V uchar |
| q__lrot | * int | * unt | *V int |
| q__rrot | * sint | * unt | *V sint |
| | * lint | * unt | *V lint |
| | * unt | * unt | *V unt |
| | * sunt | * unt | *V sunt |
| | * lunt | * unt | *V lunt |
| q__blcomp | * char | | *V char |
| | * uchar | | *V uchar |
| | * int | | *V int |
| | * sint | | *V sint |
| | * lint | | *V lint |
| | * unt | | *V unt |
| | * sunt | | *V sunt |
| | * lunt | | *V lunt |
| q__range | | | |
| q__addr | * char | | *V ptr.char |
| | * uchar | | *V ptr.uchar |
| | * int | | *V ptr.int |
| | * sint | | *V ptr.sint |
| | * lint | | *V ptt.sint |
| | * unt | | *V ptr.unt |
| | * sunt | | *V ptr.sunt |
| | * lunt | | *V ptr.lunt |
| | * flo | | *V ptr.flo |
| | * sflo | | *V ptr.sflo |
| | * lflo | | *V ptr.lflo |
| | * ieee | | *V ptr.ieee |
| | * sieee | | *V ptr.sieee |
| | * lieee | | *V ptr.lieee |
| | * ptr | | *V ptr.ptr |
| | * bcd | | *V ptr.bcd |
| | * enum | | *V ptr.enum |
| | * lab | | *V ptr.lab |
| | * proc | | *V ptr.proc |
| q__size | * char,uchar, int,sint,lint, unt,sunt,lunt, flo,sflo,lflo, bcd,enum,ptr, arr,str,union | | * int |

H. Data Movement

| op | arg1 | arg2 | result |
|---|---|---|---|
| q__mov | * char | *V char | |
| | * uchar | *V uchar | |
| | * int | *V int | |
| | * sint | *V sint | |
| | * lint | *V lint | |
| | * unt | *V unt | |
| | * sunt | *V sunt | |
| | * lunt | *V lunt | |
| | * flo | *V flo | |
| | * sflo | *V sflo | |
| | * lflo | *V lflo | |
| | * ieee | *V flo | |
| | * sieee | *V sflo | |
| | * lieee | *V lflo | |
| | * enum | *V enum | |
| | * bcd | *V bcd | |
| | * lab | *V lab | |
| | * proc | *V proc | |
| | * ptr | *V ptr | |
| q__bmov | * char | int | *V char |
| | * uchar | int | *V uchar |
| | * int | int | *V int |
| | * sint | int | *V sint |
| | * lunt | int | *V lint |
| | * unt | int | *V unt |
| | * sunt | int | *V sunt |
| | * lint | int | *V lunt |
| | * flo | int | *V flo |
| | * sflo | int | *V sflo |
| | * lflo | int | *V lflo |
| | * ieee | int | *V ieee |
| | * sieee | int | *V sieee |
| | * lieee | int | *V lieee |
| | * enum | int | *V enum |
| | * bcd | int | *V bcd |
| | * lab | int | *V lab |
| | * proc | int | *V proc |
| | * ptr | int | *V ptr |
| q__scale | * arr.any | | * char,uchar, int,sint,lint unt,sunt,lunt, flo,sflo,lflo, bcd,enum |
| q__ldi | * arr.char | * int | *V char |
| | * arr.uchar | * int | *V uchar |
| | * arr.int | * int | *V int |
| | * arr.sint | * int | *V sint |
| | * arr.lint | * int | *V lint |
| | * arr.unt | * int | *V unt |
| | * arr.sunt | * int | *V sunt |
| | * arr.lunt | * int | *V lunt |
| | * arr.flo | * int | *V flo |
| | * arr.sflo | * int | *V sflo |
| | * arr.lflo | * int | *V lflo |
| | * arr.ieee | * int | *V ieee |
| | * arr.sieee | * int | *V sflo |
| | * arr.lieee | * int | *V lflo |
| | * arr.bcd | * int | *V bcd |
| | * arr.enum | * int | *V enum |
| | * arr.ptr | * int | *V ptr |
| | * arr.lab | * int | *V lab |
| | * arr.proc | * int | *V proc |
| q__sti | * arr.char | * int | * char |
| | * arr.uchar | * int | * uchar |
| | * arr.int | * int | * int |
| | * arr.sint | * int | * sint |
| | * arr.lint | * int | * lint |
| | * arr.unt | * int | * unt |
| | * arr.sunt | * int | * sunt |
| | * arr.lunt | * int | * lunt |
| | * arr.flo | * int | * flo |
| | * arr.sflo | * int | * sflo |
| | * arr.lflo | * int | * lflo |
| | * arr.ieee | * int | * ieee |
| | * arr.sieee | * int | * sflo |
| | * arr.lieee | * int | * lflo |
| | * arr.bcd | * int | * bcd |
| | * arr.enum | * int | * enum |
| | * arr.ptr | * int | * ptr |
| | * arr.lab | * int | * lab |
| | * arr.proc | * int | * proc |
| q__aref | * arr.char | * int | *V ptr.char |
| | * arr.uchar | * int | *V ptr.uchar |
| | * arr.int | * int | *V ptr.int |
| | * arr.sint | * int | *V ptr.sint |
| | * arr.lint | * int | *V ptr.lint |
| | * arr.unt | * int | *V ptr.unt |
| | * arr.sunt | * int | *V ptr.sunt |

| | | | | | | | |
|---|---|---|---|---|---|---|---|
| | * arr.lunt | * int | *V ptr.lunt | | | ieee,sieee,lieee, | |
| | * arr.flo | * int | *V ptr.flo | | | bcd,enum,ptr | |
| | * arr.sflo | * int | *V ptr.sflo | | q__ctsint | * char,uchar, | *V sint |
| | * arr.lflo | * int | *V ptr.lflo | | | int,sint,lint, | |
| | * arr.ieee | * int | *V ptr.ieee | | | unt,sunt,lunt, | |
| | * arr.sieee | * int | *V ptr.sieee | | | flo,sflo,lflo, | |
| | * arr.lieee | * int | *V ptr.lieee | | | ieee,sieee,lieee, | |
| | * arr.bcd | * int | *V ptr.bcd | | | bcd | |
| | * arr.enum | * int | *V ptr.enum | | q__ctlint | * char,uchar, | *V lint |
| | * arr.ptr | * int | *V ptr.ptr | | | int,sint,lint, | |
| | * arr.lab | * int | *V ptr.lab | | | unt,sunt,lunt, | |
| | * arr.proc | * int | *V ptr.proc | | | flo,sflo,lflo, | |
| q__ldf | * str.char | field | *V char | | | ieee,sieee,lieee, | |
| | * str.int | field | *V int | | | bcd | |
| | * str.sint | field | *V sint | | q__ctunt | * char,uchar, | *V unt |
| | * str.lint | field | *V lint | | | int,sint,lint, | |
| | * str.unt | field | *V unt | | | unt,sunt,lunt, | |
| | * str.sunt | field | *V sunt | | | flo,sflo,lflo, | |
| | * str.lunt | field | *V lunt | | | ieee,sieee,lieee, | |
| | * str.flo | field | *V flo | | | bcd | |
| | * str.sflo | field | *V sflo | | q__ctsunt | * char,uchar, | *V sunt |
| | * str.lflo | field | *V lflo | | | int,sint,lint, | |
| | * str.ieee | field | *V ieee | | | unt,sunt,lunt, | |
| | * str.sieee | field | *V sieee | | | flo,sflo,lflo, | |
| | * str.lieee | field | *V lieee | | | ieee,sieee,lieee, | |
| | * str.bcd | field | *V bcd | | | bcd | |
| | * str.enum | field | *V enum | | q__ctlunt | * char,uchar, | *V lunt |
| | * str.ptr | field | *V ptr | | | int,sint,lint, | |
| | * str.lab | field | *V lab | | | unt,sunt,lunt, | |
| q__stf | * str.char | field | * char | | | flo,sflo,lflo, | |
| | * str.int | field | * int | | | ieee,sieee,lieee, | |
| | * str.sint | field | * sint | | | bcd | |
| | * str.lint | field | * lint | | q__ctflo | * char,uchar, | *V flo |
| | * str.unt | field | * unt | | | int,sint,lint, | |
| | * str.sunt | field | * sunt | | | unt,sunt,lunt, | |
| | * str.lunt | field | * lunt | | | flo,sflo,lflo, | |
| | * str.flo | field | * flo | | | bcd | |
| | * str.sflo | field | * sflo | | q__ctsflo | * char,uchar, | *V sflo |
| | * str.lflo | field | * lflo | | | int,sint,lint, | |
| | * str.ieee | field | * ieee | | | unt,sunt,lunt, | |
| | * str.sieee | field | * sieee | | | flo,sflo,lflo, | |
| | * str.lieee | field | * lieee | | | bcd | |
| | * str.bcd | field | * bcd | | q__ctlflo | * char,uchar, | *V lflo |
| | * str.enum | field | * enum | | | int,sint,lint, | |
| | * str.ptr | field | * ptr | | | unt,sunt,lunt, | |
| | * str.lab | field | * lab | | | flo,sflo,lflo, | |
| q__sref | * str.char | * int | *V ptr.char | | | bcd | |
| | * str.uchar | * int | *V ptr.uchar | | q__ctieee | * char,uchar, | *V ieee |
| | * str.int | * int | *V ptr.int | | | int,sint,lint, | |
| | * str.sint | * int | *V ptr.sint | | | unt,sunt,lunt, | |
| | * str.lint | * int | *V ptr.lint | | | ieee,sieee,lieee | |
| | * str.unt | * int | *V ptr.unt | | q__ctsieee | * char,uchar, | *V sieee |
| | * str.sunt | * int | *V ptr.sunt | | | int,sint,lint | |
| | * stc.lunt | * int | *V ptr.lunt | | | unt,sunt,lunt, | |
| | * str.flo | * int | *V ptr.flo | | | ieee,sieee,lieee | |
| | * str.sflo | * int | *V ptr.sflo | | q__ctlieee | * char,uchar, | *V lieee |
| | * str.lflo | * int | *V ptr.lflo | | | int,sint,lint, | |
| | * str.ieee | * int | *V ptr.ieee | | | unt,sunt,lunt, | |
| | * str.sieee | * int | *V ptr.sieee | | | ieee,sieee,lieee | |
| | * str.lieee | * int | *V ptr.lieee | | q__ctbcd | * char,uchar, | *V bcd |
| | * str.bcd | * int | *V ptr.bcd | | | int,sint,lint, | |
| | * str.enum | * int | *V ptr.enum | | | unt,sunt,lunt, | |
| | * str.ptr | * int | *V ptr.ptr | | | flo,sflo,lflo, | |
| | * str.lab | * int | *V ptr.lab | | | bcd | |
| | * str.proc | * int | *V ptr.proc | | q__ctenum | * int | *V enum |
| | I. Conversions | | | | q__ctptr | * int | *V ptr |
| q__ctchar | * char,uchar, | | *V char | | | | |
| | int,sint,lint, | | | | | | |
| | unt,sunt,lunt, | | | | | | |
| | flo,sflo,lflo, | | | | | | |
| | ieee,sieee,lieee, | | | | | | |
| | bcd | | | | | | |
| q__ctuchar | * char,uchar, | | *V uchar | | | | |
| | int,sint,lint, | | | | | | |
| | unt,sunt,lunt, | | | | | | |
| | flo,sflo,lflo, | | | | | | |
| | ieee,sieee,lieee, | | | | | | |
| | bcd | | | | | | |
| q__ctint | * char,uchar, | | *V int | | | | |
| | int,sint,lint, | | | | | | |
| | unt,sunt,lunt, | | | | | | |
| | flo,sflo,lflo, | | | | | | |

NOTES
In these cases, the procedure or label object need not be a constant (although it usually will). A procedure or label valued object is allowed in these locations.

We claim:

1. A method for directing a digital data processor to convert high level language source code data into corresponding machine language instruction data, comprising: converting the source into data in the form of an intermediate language compatible with a plurality of high level languages and digital data processor target machines, and then converting the intermediate language data into machine language instruction data.

2. The method of claim 1 and further including optimizing the intermediate language data whereby a single optimizing program may be used with many different high level languages.

3. The method according to claim 1 wherein said high level languages are of the strongly typed static language category.

4. The method according to claim 3 wherein said plurality of high level languages includes at least one of COBOL and RPG.

5. The method according to claim 3 wherein said intermediate language is of a quad type.

6. The method according to claim 1 and further including carrying out interactive debugging on a compiled program when it is in the form of intermediate language data, whereby the same symbolic debugging program can be used with said plurality of high level languages and target machines.

7. The method according to claim 1 and further including the step of linking the machine language instruction data, corresponding to programs written in different high level languages, through said intermediate language whereby because of commonality of said intermediate language, programs within any of said plurality of high level languages can call programs written in any of said plurality of high level languages.

8. The method according to claim 1 wherein said high level language is COBOL.

9. The method according to claim 1 wherein said high level language is FORTRAN.

10. The method according to claim 1 wherein said high level language is BASIC.

11. The method according to claim 1 wherein said high level language is PASCAL.

12. The method according to claim 1 wherein said high level language is RPG.

13. The method according to claim 1 wherein said high level language is PL/I.

14. The method according to claim 1 wherein said high level language is ADA.

15. The method according to claim 1 wherein said high level language is C.

16. The method according to claim 1 wherein said high level language is MODULA-2.

17. A method, using a digital data processor for converting high level language source code data into machine language instruction data, the method comprising the steps of
 (a) identifying tokens in the source code;
 (b) parsing the tokens according to the language of the source code;
 (c) converting representations of the parsed source into a sequence of statements in an intermediate language, the intermediate language being capable of embodying any high level language and interfacing with any digital data processor;
 (d) creating a stored table of all of the objects and their attributes in the representation of the source;
 (e) allocating memory space according to information contained in the table;
 (f) generating assembly language instructions corresponding to the intermediate language and table representations of the source;
 (g) translating the assembly language instructions into machine language.

18. A method for converting a program written in a high level language into a corresponding sequence of machine language instructions comprising converting high level language source code data into an intermediate language data and a symbol table to generate machine language instructions.

19. The method of claim 18 wherein the same intermediate language may be used for programs written in BASIC, C, COBOL, FORTRAN, MODULA-2, PASCAL, RPG, ADA and PL/I.

20. The method of claim 19 wherein said intermediate language code is compatible with machine language for any of a plurality of digital data processor target machines.

21. A digital data processor including means for inputting data, means for storing data, means for executing machine language instructions, and means for outputting data, wherein the improvement comprises:
 a. means for, first, converting high level language source code data input through the input means into intermediate language data, stored in the storage means and compatible with a plurality of digital data processors and with a plurality of high level languages; and
 b. means for, second, converting said intermediate language data into machine language instruction data executable by said executing means so as to complete compilation of said source code.

22. The processor of claim 21 and further including means for optimizing said intermediate language data whereby a single optimizing means may be used with a plurality of high level languages.

23. The processor of claim 21 wherein said first converting means is particularly adapted to high level languages of the strongly typed static category.

24. The processor of claim 21 wherein said second converting means is particularly adapted to at least one of the high level languages RPG and COBOL.

25. The processor of claim 23 wherein said first and second converting means are particularly adapted to intermediate language data of the quad type.

26. The processor of claim 21 and further including means for carrying on interactive debugging of said intermediate language data, so as to allow use of the same debugging means for a plurality of high level languages and digital data processors.

27. The processor of claim 21 and further including means for linking machine language instruction data so as to allow high level language source code data written in any of a plurality of high level languages to include calls to high level language source code data written in any of said plurality of high level languages.

28. The apparatus of claim 21 wherein said first converting means is particularly adapted to high level language source code data written in COBOL.

29. The apparatus of claim 21 wherein said first converting means is particularly adapted to high level language source code data written in FORTRAN.

30. The apparatus of claim 21 wherein said first converting means is particularly adapted to high level language source code data written in BASIC.

31. The apparatus of claim 21 wherein said first converting means is particularly adapted to high level language source code data written in PASCAL.

32. The apparatus of claim 21 wherein said first converting means is particularly adapted to high level language source code data written in RPG.

33. The apparatus of claim 21 wherein said first converting means is particularly adapted to high level language source code data written in PL/I.

34. The apparatus of claim 21 wherein said first converting means is particularly adapted to high level language source code data written in ADA.

35. The apparatus of claim 21 wherein said first converting means is particularly adapted to high level language source code data written in C.

36. The apparatus of claim 21 wherein said first converting means is particularly adapted to high level language source code data written in MODULA-2.

37. The processor of claim 22 wherein said first converting means further includes:
  a. means for identifying tokens in said high level language source code data;
  b. means for parsing tokens according to a high level language grammar of said high level language source code to output representations of parsed source code, said representations including objects;
  c. means for creating a stored table of all said objects and their attributes which appear in the output of said parsing means; and
  d. means for allocating memory space according to said stored table; and wherein said second converting means further includes:
  e. means for generating assembly assembly language instruction data corresponding to said intermediate language data, said stored table, and said memory space allocation; and
  f. means for translating said assembly language instruction data into said machine language instruction data.

38. A digital data processor including means for inputting data, means for storing data, means for executing machine language instructions, and means for outputting data, wherein the improvement comprises:
  a. means for, first, converting high level language source code data input through the input means into intermediate language data and a symbol table, stored in the storage means and compatible with a plurality of digital data processors and with a plurality of high level languages; and
  b. means for, second, converting said intermediate language data into machine language instruction data executable by said executing means so as to complete compilation of said source code.

39. The processor of claim 38 wherein a common intermediate language may be used for high level source code data written in BASIC, C, COBOL, FORTRAN, MODULA-2, PASCAL, RPG, ADA, and PL/I.

40. The processor of claim 39 wherein said common intermediate language is compatible with machine languages for any of a plurality of digital data processors.

* * * * *